(12) United States Patent
Kristensen

(10) Patent No.: US 10,788,013 B2
(45) Date of Patent: Sep. 29, 2020

(54) UNDERWATER ELECTRICAL POWER PLANT, A SYSTEM AND A METHOD

(71) Applicant: Norwegian Tidal Solutions AS, Stavanger (NO)

(72) Inventor: Roar Kristensen, Sandnes (NO)

(73) Assignee: Norwegian Tidal Solutions AS, Stavanger (NO)

( * ) Notice: Subject to any disclaimer, the term of this patent is extended or adjusted under 35 U.S.C. 154(b) by 102 days.

(21) Appl. No.: 16/093,773

(22) PCT Filed: May 9, 2017

(86) PCT No.: PCT/NO2017/050114
§ 371 (c)(1),
(2) Date: Oct. 15, 2018

(87) PCT Pub. No.: WO2017/196183
PCT Pub. Date: Nov. 16, 2017

(65) Prior Publication Data
US 2019/0128239 A1 May 2, 2019

(30) Foreign Application Priority Data
May 10, 2016 (NO) .................................. 20160787

(51) Int. Cl.
*F03B 13/26* (2006.01)
*F03B 17/06* (2006.01)
(Continued)

(52) U.S. Cl.
CPC ............ *F03B 13/264* (2013.01); *F01D 15/10* (2013.01); *F03B 17/061* (2013.01); *E02B 9/08* (2013.01);
(Continued)

(58) Field of Classification Search
CPC ......................................................... E02B 9/08
See application file for complete search history.

(56) References Cited

U.S. PATENT DOCUMENTS 8,022,567 B2    9/2011  Davis et al.
8,115,329 B2 *  2/2012  Thompson .............. F01D 5/141
                                                            290/43
(Continued)

FOREIGN PATENT DOCUMENTS

EP    2412971    2/2012
GB    2426295    11/2006
(Continued)

OTHER PUBLICATIONS

Norwegian Search Report, Norwegian Patent Application No. 20160787, date of report Nov. 11, 2016.
(Continued)

*Primary Examiner* — Brian P Wolcott
*Assistant Examiner* — Jason G Davis
(74) *Attorney, Agent, or Firm* — Andrus Intellectual Property Law, LLP

(57) ABSTRACT

An underwater power plant, a method and a system are for converting kinetic energy of flowing water into electricity. The power plant has at least one turbine house defining a duct for housing a turbine apparatus, and a connecting means for attaching the turbine apparatus in the duct. The connecting means has at least one member slidably connected to the turbine house for allowing sliding of the turbine apparatus out of, into or within the turbine house.

15 Claims, 24 Drawing Sheets

(51) Int. Cl.
*F01D 15/10* (2006.01)
*E02B 9/08* (2006.01)

(52) U.S. Cl.
CPC ..... *F05B 2230/60* (2013.01); *F05B 2230/604* (2013.01); *F05B 2230/70* (2013.01); *F05B 2240/133* (2013.01); *F05B 2240/14* (2013.01); *F05B 2240/40* (2013.01); *F05B 2240/97* (2013.01); *F05B 2270/20* (2013.01); *Y02E 10/20* (2013.01); *Y02P 70/50* (2015.11)

(56) References Cited

U.S. PATENT DOCUMENTS

| | | | |
|---|---|---|---|
| 8,120,197 | B2 | 2/2012 | Branco |
| 8,573,890 | B2 | 11/2013 | Gehring |
| 8,616,829 | B2 * | 12/2013 | Becker .................. F03B 3/04 |
| | | | 290/43 |
| 2005/0285407 | A1 | 12/2005 | David et al. |
| 2009/0115193 | A1 | 5/2009 | Branco |
| 2012/0027524 | A1 | 2/2012 | Gehring |
| 2012/0189448 | A1 | 7/2012 | Thomas et al. |
| 2013/0088014 | A1 | 4/2013 | Holstein et al. |

FOREIGN PATENT DOCUMENTS

| | | |
|---|---|---|
| GB | 2447514 | 9/2008 |
| JP | 2015102086 | 11/2014 |
| KR | 101030748 | 4/2011 |
| WO | 2016064886 | 4/2016 |

OTHER PUBLICATIONS

International Search Report, PCT/NO2017/050114, dated Aug. 21, 2017.
Written Opinion, PCT/NO2017/050114, dated Aug. 21, 2017.

* cited by examiner

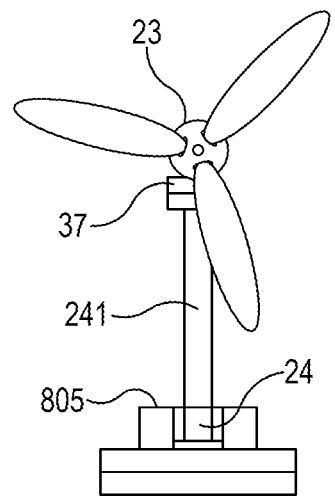
Fig. 25a
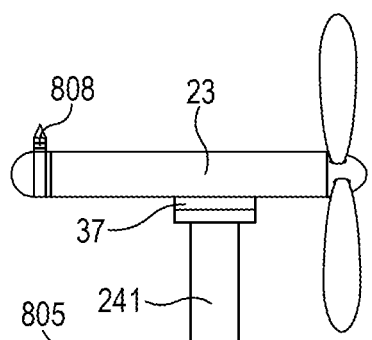
Fig. 25b
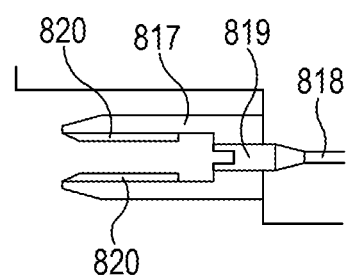
Fig. 25b1
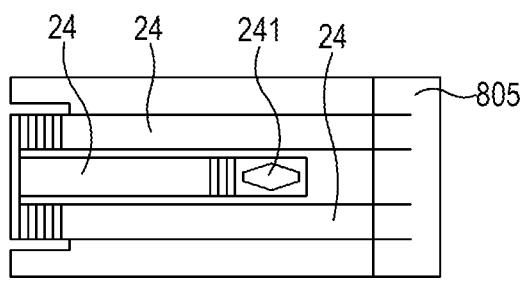
Fig. 25c

UNDERWATER ELECTRICAL POWER PLANT, A SYSTEM AND A METHOD

CROSS-REFERENCE TO RELATED APPLICATIONS

This application is the U.S. national stage application of International Application PCT/NO2017/050114, filed May 9, 2017, which international application was published on Nov. 16, 2017, as International Publication WO 2017/196183 in the English language. The International Application claims priority of Norwegian Patent Application No. 20160787, filed May 10, 2016. The international application and Norwegian application are both incorporated herein by reference, in entirety.

FIELD

The present invention relates to an underwater power plant. More particularly, the invention relates to an underwater power plant for converting kinetic energy of flowing water into electricity. The power plant comprises at least one turbine house defining a duct for housing a turbine apparatus, and a connecting means for attaching the turbine apparatus in the duct. The invention further relates to a power plant system comprising the underwater power plant and methods for bringing the components of the power plant into or out of the system. The components of the power plant may be brought into or out of the system, or the turbine apparatus may be slid with respect to the turbine house, either fully automated or operated by a ROV from a vessel or from a remote location.

By sliding the turbine apparatus with respect to the turbine house, which house is preferably shaped like a Venturi duct, the turbine may be positioned in a portion of the turbine house having a desired speed of water. The underwater power plant according to the present invention will work equally well in neap and spring tides as the turbine apparatus may be configured for automatically seeking the optimal water speed for best possible power production, as will be explained below.

The underwater power plant is unique due to its flexible design and scalability and may be built modularly or as a large solid construction which may be configured for floatation to a location where it is lowered by means of reducing the buoyancy directly onto its location to rest on the sea floor.

BACKGROUND

The world's population has dramatically increased over the last decades. This increase in population, together with a strong increase in living standards in many regions, have contributed to a growth in energy consumption.

Following the Paris Climate Change Conference 2015, parties aim to reach global peaking of greenhouse gas emissions as soon as possible, and the government of 186 countries have committed to setting a goal for how much they will cut their emissions. Thus, the conference indicates a major turning point for international climate cooperation.

There is therefore a demanding need for renewable energy, for example energy from a source that is not depleted when used, such as wind, water or solar power. However, energy harvested from wind requires major windfarms or wind parks on land or at sea. Such windfarms may consist of several hundred individual wind turbines and may cover an extended area of tens square kilometres. As such, at least for some people, a windfarm may represent a visible and/or audible pollution. Solar power plants designed for generating electrical energy to the community suffer from the same disadvantages, although solar panels for self-supply of electrical energy may be incorporated in existing buildings.

A major disadvantage of windfarms and solar power plants is that they depend on wind and sun (radiation from the sun), respectively, to produce energy.

Harvesting energy from water, such as for example marine currents, has several advantages over harvesting energy from other renewable energy sources such as wind and sun. Marine currents may be relatively constant and thus provide a reliable energy source being independent of changing weather conditions. Energy may be harvested by means of underwater power plants that will not represent any visible pollution. Another major advantage of harvesting energy from water versus wind is the density of water being about 832 times that of air, resulting in reduced turbine blade diameters for similar power output.

Patent publication U.S. Pat. No. 8,120,197 B2 discloses a water turbine for generating electricity. The water turbine comprises an array of water turbine assemblies positioned between two I-beams driven into the bed of a flowing water system. Each water turbine assembly comprises a modular box-shaped housing having an inlet and outlet for accelerating the flow of water therethrough. The turbine has a ring gear positioned about the periphery thereof in mechanical communication with a plurality of generators for converting the kinetic energy of flowing water into electricity. Receiving means are positioned and attached to the inlet and outlet of the housing for collecting, concentrating, directing and accelerating water through the turbine in the throat section of each water turbine assembly. Each box-shaped modular housing is structurally communicated with other housings by interlocking mating surfaces.

Patent publication U.S. Pat. No. 8,022,567 B2 discloses a turbine apparatus for generating electrical power from water or air flow comprising at least one rotor disc having a plurality of hydrofoil blades, guide vanes, a cylindrical housing, and a generator means. A rim generator comprising a magnet race rotor rim and fixed stator coils in the housing is used. The apparatus is fitted with a screen to stop the ingress of debris and marine life, and a skirt augmenter device to reduce the Betz effect. The apparatus is preferably for sub-sea deployment and driven by tidal currents, but may be powered by river current or wave driven air or by wind. The apparatus may be deployed on at least one telescoping pole, tethered to the seabed and kept buoyant by buoyant concrete in the housing, or inserted in a dam, under a barge or in a tidal power array.

Patent publication U.S. Pat. No. 8,573,890 B2 discloses an offshore structure for deploying and retrieving underwater electrical power generators that converts energy derived from water currents into electrical energy. The offshore structural platform includes a pair of vertical guide rails to guide a propulsion device lowering said generator underwater onto a seabed propulsion device. The seabed propulsion device is engaged on an underwater seabed rail system and transports the generator onto one of many unique frames specifically designed to support underwater generators. Securing devices are utilized to ensure the generators remain anchored to each propulsion device and to the unique frame. Rail transferring elements are also utilized for a smooth and safe transition during the transport process.

Publication US 2013088014 discloses a hydroelectric power plant comprising a power unit including a turbine. The power unit is a cassette-type being accommodated in a housing. The power unit is configured for being inserted into or removed from the housing via an opening through a top portion of the housing.

A major challenge of prior art underwater power plants is related to maintenance. An underwater power plant is subject to harsh conditions. An underwater turbine apparatus may therefore require maintenance or replacement on a regular basis. In most cases, any maintenance will require bringing the turbine apparatus out of the water. The turbine house, i.e. the duct housing the turbine apparatus, is typically made of solid material and designed for an operating time in the water exceeding the operating time of the turbine apparatus. Further, the turbine house may be heavy. Any lifting of the turbine house and the turbine apparatus may require a heavy-duty surface vessel. In some areas, for example in a stream, canal or a tidal bay, an available space for such a vessel may be limited. Further, a heavy-duty surface vessel is normally more expensive to operate than a light surface vessel.

In an underwater power plant, a plurality of turbine apparatuses are typically arranged in respective turbine houses in arrays and/or columns to generate desired electrical energy. Especially when arranged in columns, access to a turbine apparatus having one or more turbine apparatuses and turbine houses stacked on top, will require lifting of the overlying turbine apparatuses and housings prior to lifting the relevant turbine apparatus and turbine house out of the water. Such an operation will be time-consuming and expensive.

There is therefore a need for an underwater power plant wherein the turbine apparatus is separable from the turbine house so that only the turbine apparatus itself or the turbine apparatus together with relevant components such as the connection means connecting the turbine apparatus in the duct, are lifted to the surface, maintained and reinstalled in the turbine house, while the turbine house is left in place under water.

There is also a need for an underwater power plant that may allow for adapting to desired need for electrical energy, for example upscaling, substantially without influencing the operation of the existing power plant.

SUMMARY

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

In a first aspect of the invention there is provided an underwater power plant for converting kinetic energy of flowing water into electricity, the power plant comprises at least one turbine house defining a duct for housing a turbine apparatus, and a connecting means for attaching the turbine apparatus in the duct. The characteristic feature of the invention is that the connecting means comprises at least one member slidably connected to the turbine house for allowing sliding of the turbine apparatus out of, into or within the turbine house, wherein the member is an elongate member having a length exceeding an axial length of the turbine apparatus, and the elongate member being capable of attaching the turbine apparatus to the turbine house also when the turbine apparatus is slid to a position outside of the turbine house. By the term turbine apparatus is meant an apparatus comprising at least one turbine and generator.

This has the effect that the turbine apparatus itself, and in one embodiment also relevant components such as the connection means attaching the turbine apparatus in the duct, can be handled independently of the housing, both during installation and during subsequent maintenance throughout the lifetime of the underwater power plant, and also during operation of the power plant. Further, a turbine apparatus slid to a position outside of the turbine house may allow for vertical lifting of the turbine apparatus. Thus, the turbine apparatus may be disconnected from the elongate member and hoisted vertically to and from the surface. Alternatively, the turbine apparatus, the elongate member and any means connecting the turbine apparatus to the elongate member may be disconnected together for automatic recovery to surface, as will be discussed below. The elongate member and the connection means will hereinafter also be denoted turbine member skid.

In an underwater power plant comprising a plurality of turbine apparatuses, the power plant may be in operation while for example maintenance or replacement of the relevant turbine apparatus(es) takes place, thereby providing a power plant being reliable with respect to producing electrical energy.

The turbine apparatus itself may typically be an "off-the-shelf type" being commercially available on the marked. This allows for replacement of any outdated turbine apparatus while keeping the turbine houses in place.

The elongate member may be a telescopic elongate member.

In one embodiment, the member is elongated with a longitudinal axis in the direction of flow through the duct. However, in an alternative embodiment the member may for example be a plate member or a grid member that does not necessarily have to be elongate. A plate member may for example be slidably connected to portions of the turbine house by means of slots arranged in the turbine house.

An underwater power plant according to the present invention may be placed in deep water and/or in water with strong currents caused for example by tidal range. Thus, it may be dangerous or impossible for divers to involve in the operation of any sliding and connection/disconnection of the turbine apparatus to/from the elongate member. In a preferred embodiment of the present invention, said operations are therefore adapted for ROV-operations (ROV—Remotely operated underwater vehicle), automatic operations or a combination of ROV operations and automatic operations as will be discussed below.

In one embodiment, the member may comprise a crib for receiving a protrusion from a body of the turbine apparatus. A crib has the advantage of supporting the turbine apparatus both laterally and vertically. By laterally is meant in a longitudinal and transverse direction of the duct of the turbine house. In another embodiment, the turbine apparatus may comprise a fixed structure for connecting the turbine apparatus to the elongate member and supporting the turbine apparatus both laterally and vertically The turbine may be bi-directional or unidirectional. A bi-directional turbine is particularly advantageous when the underwater power plant is a tidal power plant. Electrical energy will then be produced for both directions of the tidal current. In a preferred embodiment, the turbine apparatus is provided with a first rotor disc and a second rotor disc, both of which are provided with rotor blades, wherein the first rotor disc is arranged for counter rotating with respect to the second rotor disc.

In order to optimize the turbine for bi-directional operation, the rotor discs may have an elliptic profile mirrored about a centreline of the vanes of the discs.

The generator of the turbine apparatus may be arranged between the first rotor disc and the second rotor disc.

A unidirectional turbine may be advantageous where the tidal power plant is automatically operated. In an automatically operated power plant, turbine may be provided with sensors providing information or data regarding one or more of the following; rotation speed, torque, power, current and voltage. The information or data provided by the sensors that may be sent to a control system to operate sliding of the turbine apparatus to a desired position in the duct to provide an optimal power production. Thus, the control system may be used for controlling driving means for sliding the elongate member and thus the turbine apparatus, to a desired position within the duct. Further, a turbine apparatus in an automatically operated power plant may be provided with means configured for pivoting the turbine apparatus 180° with respect to the slidable member so that the turbine of the turbine apparatus may be oriented in an optimal direction with respect to direction and speed of water in a tidal stream flowing through the duct.

The speed and direction of flow of water depend on the tides.

When the flow of water through the duct of the housing is low, typically when tide is changing, the control system may operate sliding of the turbine apparatus to a position where the turbine apparatus may be pivoted 180° and thereafter sliding the turbine apparatus to a desired, i.e. optimal, position within the duct. Such an automatically operated tidal power plant may thus arrange the turbine in an optimal position with respect to direction and speed of the flowing water in a tidal stream.

Preferably, in a power plant comprising a plurality of turbines, at least one of the turbines is controlled independently of the other turbines. In one embodiment, each turbine is controlled independently of the other turbines.

The turbine house has at least three wall portions having an outer surface and an inner surface, the wall portions being interconnected for forming the duct having an inlet and an outlet.

At least one of the wall portions may be provided with a slot for slidably connecting and guiding the member in the turbine house. The slot may be unlined, especially if the slot is provided in a portion of the turbine house made from metal. However, in one embodiment the housing may be made from concrete. In such an embodiment, the slot may be lined, i.e. provided with a suitable lining material, for example metal, to prevent wear of the concrete.

At least one of the wall portions may in an alternative embodiment be provided with a slidably connected turbine member skid having a first portion connected to the wall of the duct, and a second portion being slidably connected to the first portion of the skid in a telescopic manner.

In order to increase the efficiency of a ROV operated underwater power plant, a flow area at an inlet and an outlet of the turbine house may be larger than a flow area at a section between said inlet and outlet in the direction of flow, thereby providing a constricted section creating a Venturi effect. The section between said inlet and outlet may typically be a centre portion surrounding the turbine apparatus while in an operating position.

In an underwater power plant according to the present invention, a plurality of turbine assemblies comprising turbine apparatuses arranged in turbine houses may be arranged in rows and columns. Such turbine houses arranged in rows and columns will hereinafter also be denoted turbine block.

In order to increase the efficiency of an automatically operated underwater power plant, a flow area at an inlet and an outlet of a turbine block housing, which in one embodiment comprises several turbine blocks, may be larger than a flow area at a section between said inlet and outlet in the direction of flow, thereby providing a constricted section creating a Venturi effect. The section between said inlet and outlet may typically be a centre portion surrounding the turbine block.

In order to adjust the position of the turbine apparatus with respect to the speed of water through the turbine apparatus, the slidably connected turbine member skid may be used to slide the turbine apparatus in or out of the centre portion of the turbine house.

An object flowing in the water may flow into the duct of the turbine house. Such an object hitting the turbine apparatus, especially the vanes of the turbine, may cause serious damage to the turbine apparatus. An object flowing into the duct may also get stuck and cause blockage of the duct and malfunction of the turbine apparatus. In order to at least reduce the risk of objects damaging the turbine apparatus and/or fully or partially blocking the duct of the turbine house, the end portions of the turbine house or the turbine block may be provided with a lattice. In one embodiment, the lattice has a conical form for diverting objects exceeding a predetermined size towards the wall portions of the turbine house.

In one embodiment, at least one of the lattices is releasable connected to a portion of the turbine house.

As previously mentioned, the underwater power plant may comprise a plurality of turbine houses, for example at least two, where the housing of the turbine and/or the turbine block may be constructed as one solid piece or wherein an outer surface of the houses being complementary adapted to each other for allowing adjacent placement of the houses side by side and/or on top of each other. This has the effect that substantially all water flowing through the power plant has to pass through the ducts and thereby the turbines, and not between neighbouring houses. The turbine houses may in such an embodiment be provided with engagement means for interlocking neighbouring turbine houses. The effects of such interlocking means are increased stability of the houses in that relative movement between the houses are prevented, while at the same time the interlocking means may facilitate correct arrangement of the houses during installation.

In one embodiment a collocation of a plurality of turbine houses may be provided with a flow diverting means, for example an inclined "skirt", for diverting a water current otherwise passing on an outside of a periphery of the collocation, into the ducts of the turbine houses.

The turbine apparatus may be configured for automatic operation. Such an automatically operated turbine apparatus may further comprise a sensor device for sensing at least one of rotation speed, torque, power, current and voltage. Such a sensor device is in communication with a control system configured for controlling driving means for sliding the elongate member in the duct to bring the turbine apparatus to an optimal position with respect to power production.

In a second aspect of the invention, there is provided a ROV operated power plant system comprising the power plant according to the first aspect of the invention, wherein the system further comprises a base for supporting the at least one house, the base comprising at least one modular base frame connectable to a plurality of supports extending into a seabed.

In another embodiment, the base for supporting the at least one turbine house may comprise a solid construction resting on the seabed by means of gravity.

The base may be provided with a receptacle for holding at least a coupling unit for connecting a jumper cable from the at least one turbine apparatus to at least an electric power cable. The coupling unit may also house telemetry for controlling the power plant. In such a case, a telemetry cable may run in parallel with said electric power cable. The telemetry cable may for example be a fibre optics cable or a copper cable. Further, the coupling unit may house other equipment such as one or more transformers, power electronics and electronics for controlling the power plant. Thus, the power cable and the jumper cable may comprise an integrated fibre optics cable or other type of signal cable. Alternatively, a separate fibre optics cable or other type of signal cable may be independent of the power cable and jumper cable.

In another embodiment of the present invention there is provided an automatically operated power plant system comprising the power plant according to the first aspect of the invention, wherein the housing of the turbine apparatus and the turbine block may be constructed as one solid piece which may be designed to rest on the seabed by means of gravity The solid construction may be provided with a ballast system for ballasting the structure comprising a complete power plant allowing it to be floated from the building site to the site of operation. At the site of operation, the buoyance of the structure is reduced by means of the ballast system to position the structure on the seabed. Export cables to the power plant may be pulled through an integrated pipe facility into a high voltage room of the power plant. Such a high voltage room is typically placed above sea level. The export cables may also house a telemetry cable for controlling the power plant. The telemetry cable may for example be a fibre optics cable or a copper cable. Alternatively, a separate fibre optics cable or other type of signal cable may be independent of the export cable and the jumper cable. The jumper cables may be pushed individually through an integrated cable conduit from the electric switchboard room of the power plant to the turbine member skid.

A wireless signal transmission may be used instead of or in addition to said cable transmission.

The receptacle for a ROV operated power plant may be provided with an openable hatch for protecting the coupling unit when in operation. The jumper cable from the coupling unit to the turbine apparatus may be provided with openable covers for protecting the jumper cables when in operation.

In a third aspect of the invention, there is provided a method for bringing a turbine apparatus into or out of a ROV operated underwater power plant according to the first aspect of the invention. The method comprises sliding the turbine apparatus with respect to the turbine house into or out of the duct of the house.

The method further comprises connecting or disconnecting the turbine apparatus to the elongate member.

The sliding and connection or disconnection may be performed by means of an ROV operated from a remote location such as a surface vessel or from land.

In another aspect of the invention, there is provided a method for bringing a coupling unit for connecting the jumper cable from the at least one turbine apparatus according to the first aspect of the invention into or out of a receptacle arranged in a base of a power plant system according to the second aspect of the invention, the method comprising connecting a hoisting appliance to at least one portion of the coupling unit and lowering or lifting the coupling unit into or out of the receptacle.

The method may further comprise providing at least one guide wire for the hoisting appliance, wherein one end of the guide wire is connected to a portion of the base.

The at least one elongate member may be slidably connected to the turbine house. In one embodiment, the elongate member is arranged in a slot arranged in a wall portion of the turbine house. The elongate member may be a telescopic arm. Preferably, the operation of the slidable elongate member is configured for operation by an ROV.

In another embodiment of the invention, there is provided a method for bringing a slidably connected turbine member skid into or out of an automated underwater power plant according to the first aspect of the invention. The method comprises sliding the turbine apparatus with respect to the turbine house automatically into or out of the duct of the turbine house.

The method may further comprise connecting or disconnecting the slidably connected turbine member skid to the turbine house.

The connecting and disconnecting may be performed by means of a robotics vehicle that runs between a tower of the power plant and the turbine house of the power plant using lifts and a rail guided system.

BRIEF DESCRIPTION OF THE DRAWINGS

In the following is described an example of a preferred embodiment illustrated in the accompanying drawings, wherein:

FIGS. 25a-25c show the turbine member skid seen from the aft end in FIG. 25a, from left to right in FIG. 25b and a top plan view, seen through J-J in FIG. 25c;

FIG. 25b1 shows in larger scale detail 25b1 in FIG. 25b;

DETAILED DESCRIPTION OF THE DRAWINGS

Figure 1:
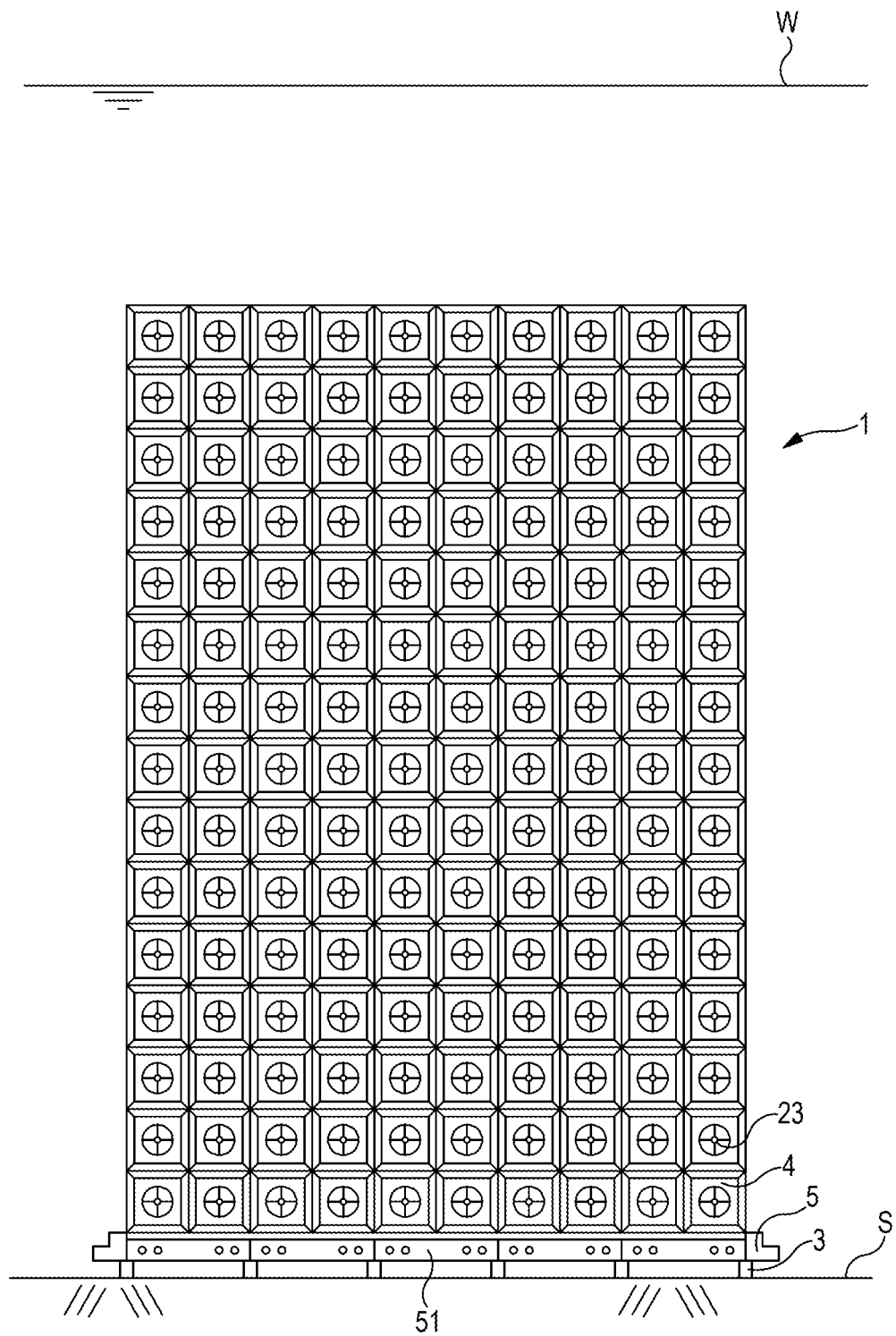
FIG. 1 shows in a view a ROV operated underwater power plant according to the present invention, wherein a plurality of turbine assemblies comprising turbine apparatuses arranged in turbine houses are arranged in rows and columns on top of a support structure comprising base frame modules connected to a seabed by means of seabed supports.

Positional specifications such as "lower", "upper", "right" and "left", refer to the positions shown in the figures.

In the figures, the same reference numerals indicate the same or corresponding elements. Not all elements are indicated by reference numerals in all the figures. As the figures are only principle drawings, the relative size ratios between individual elements may be somewhat distorted.

In the figures, the reference numeral 1 indicates an underwater power plant in accordance with the present invention. The power plant 1 comprises at least one turbine house 4 defining a duct 400 for housing a turbine apparatus 23, and a connecting means 24, 241 for attaching the turbine apparatus 23 in the duct 400. The connection means 24, 241 comprises a member 24 slidably connected to the turbine house 4 for allowing sliding of the turbine apparatus 23 out of or into the turbine house 4. In the embodiment shown, the member 24 is an elongate member. However, it should be noted that the member 24 in an alternative embodiment (not shown) may be for example a plate member or a grid member that does not necessarily have to be elongate. A plate member may for example be slidably connected to the turbine house 4 in slots arranged in lower portions of the sidewalls of the turbine house 4. In one embodiment (not shown), a plate member may be supported by means of extendable members arranged in a lower portion of the turbine house in a similar manner as arms 27 as will be discussed below and shown in FIG. 12. Thus, the plate may be supported while the turbine apparatus 23 is slid to a position outside of the turbine house 4.

FIG. 1 shows an underwater power plant system 1 according to one aspect of the present invention wherein a plurality of turbine assemblies 4, 23 comprising turbine apparatuses 23 arranged in turbine houses 4, are arranged in rows (fifteen shown) and columns (ten shown) on top of a support arrangement here shown as five base frame modules interconnected to form a base frame 51. The base frame 51 is supported by seabed supports extending into a seabed S.

In a prototype of the apparatus, the width and height of the turbine house is approximately 5 m×5 m, while the length is approximately 10 m. However, other dimensions are also conceivable without departing from the scope of the invention.

The supports 3 may for example be provided by means of arrangements based on some features known from seabed installations in the oil and gas industry. An example of installation of seabed supports 3 are shown in FIGS. 13a-13d which are discussed below.

Although the seabed S is shown flat and horizontal in FIG. 1, a person skilled in the art will know that this is normally not the case. In order to provide a substantially horizontal support for the base frame modules 5, the seabed supports 3 are typically levelled during installation. However, it is also conceivable that at least a final levelling or fine adjustment of the seabed supports 3 are provided of a threaded pin-and-box connection as is generally known in the art. Thus, the power plant rests by means of the base frame modules 5 and seabed supports 3, on the seabed S.

In FIG. 1, the underwater power plant 1 is sufficiently submerged below a water surface W for allowing passage of surface vessels (not shown).

Figure 2:
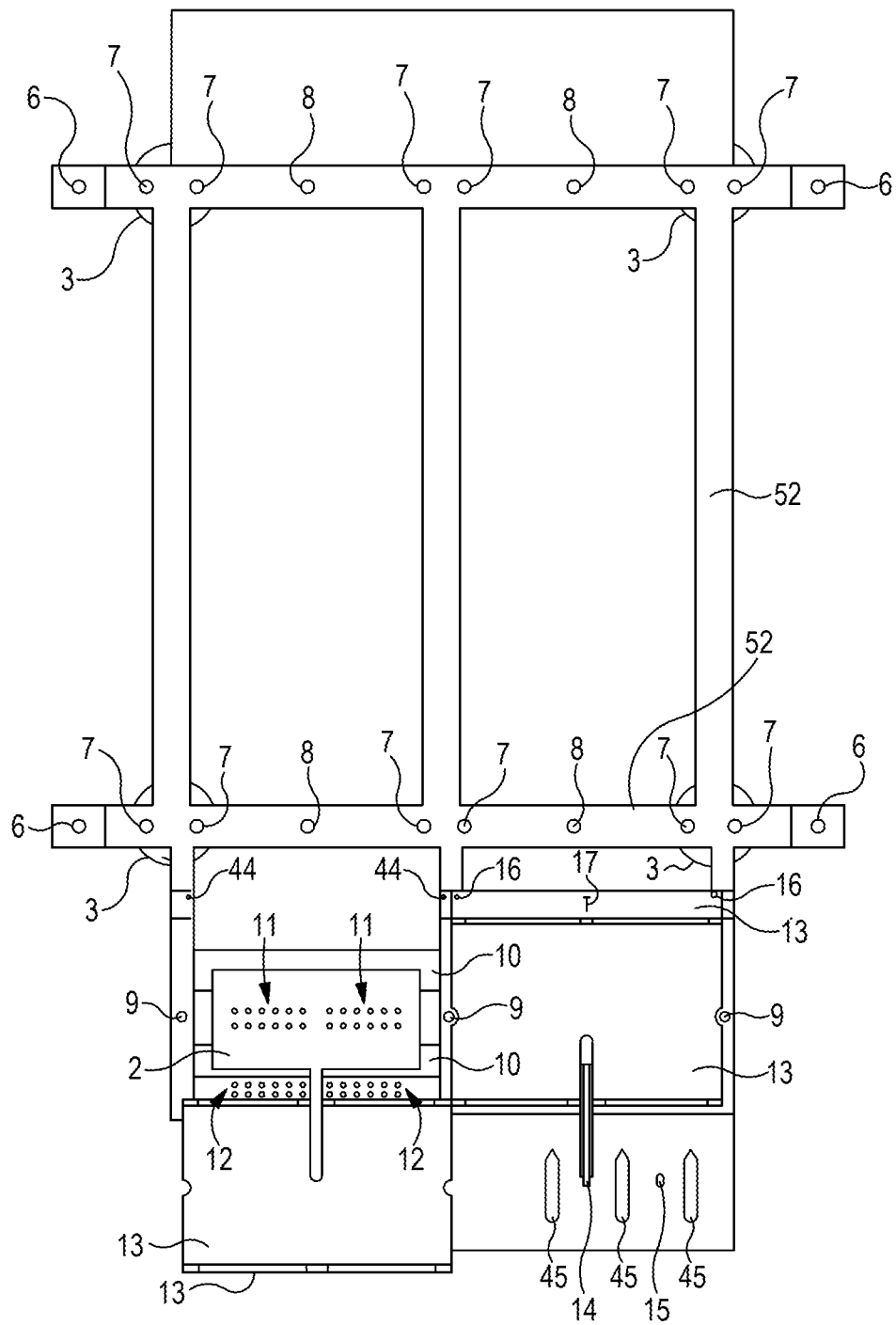
FIG. 2 shows in larger scale a top plan view of one base frame module with a coupling unit arranged in a receptacle of the base frame, wherein a hatch of the receptacle is in an open position.
Figure 3:
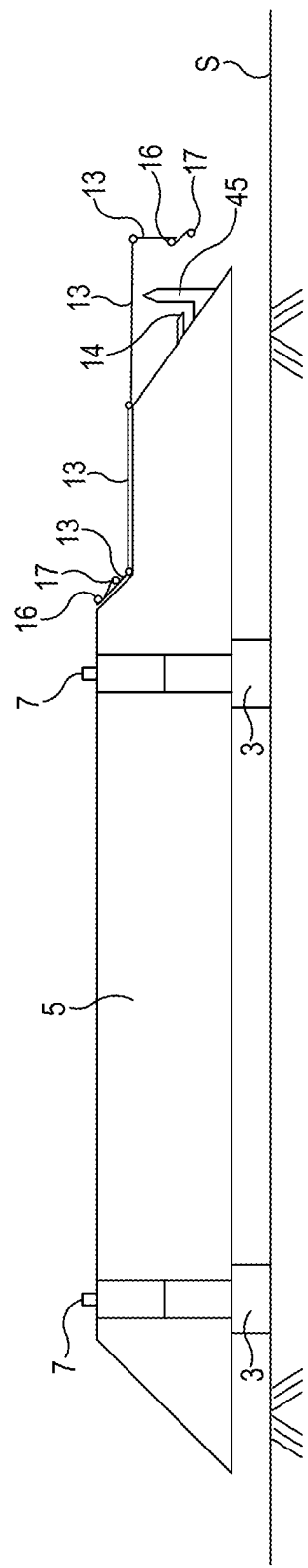
FIG. 3 shows the base frame unit shown in FIG. 2, seen from left to right.
Figure 4:
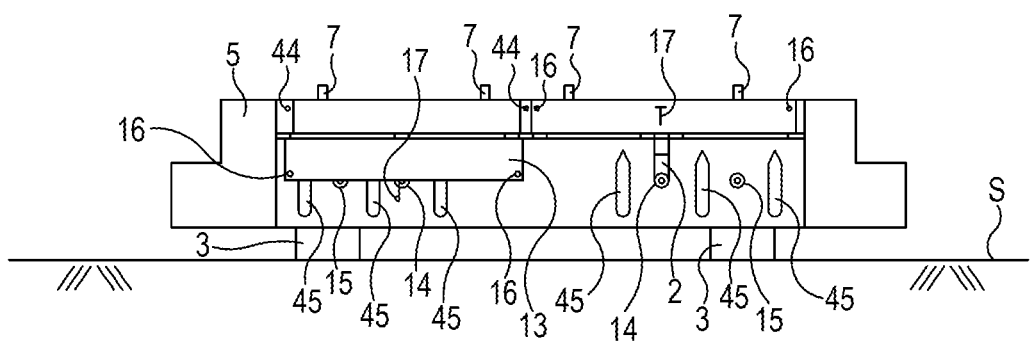
FIG. 4 shows the base frame unit shown in FIG. 3, seen from right to left.

FIGS. 2-4 show in larger scale details of one of the base frame modules 5 shown in FIG. 1 resting on seabed supports 3.

FIG. 2 is a top plan view of one type of a base frame module 5. The base frame modules 5 may be configured for side-by-side interconnection by vertical movement only. This means that the modules may comprise three alternative modules: one "centre module", and modules for connection to either left or right of the centre module.

The base frame module 5 shown in FIG. 2 comprises a frame structure 52 that may typically be made from reinforced concrete. It should be noted that at least some portions the frame structure 52 may alternatively be made from steel beams interconnected by means of welds and/or screwed connections, or from other suitable materials.

The base frame module 5 comprises a receptacle 10, here shown as a crib 10, for receiving and holding by means of gravity, at least a coupling unit 2 for connecting jumper cables (not shown) from the at least one turbine apparatus 23 to a power cable (also not shown). The coupling unit 2 is configured for being lifted or lowered substantially vertically out of or into the receptacle 10 by means of a hoisting appliance (not shown), for maintenance or replacement.

The coupling unit 2 shown in FIG. 2 is a sealed, watertight can capable of resisting water pressure. The coupling unit 2 may also house any control devices, generally denoted telemetry in this document, for controlling the power plant 1 and communication devices for communicating with a remote surface control centre for the power plant. The coupling unit 2 will in the following also be denoted a power and telemetry can 2. The power and telemetry can 2 may also house other equipment such as transformer(s), power electronics etc.

The power and telemetry can 2 is provided with connection points 11 for receiving jumper cables from the turbine apparatuses 23 arranged in turbine houses 4 that is carried by the support structure 5.

Adjacent the power and telemetry can 2 is a plurality of socket parking points 12 for holding sockets of the jumper cables during any replacement or maintenance of the power and telemetry can 2.

In order to protect the power and telemetry can 2 during operation of the power plant 1, the receptacle or crib 10 is provided with a hatch 13 hingedly connected to a portion of the base frame module 5. In FIG. 2 are shown two hatches 13, each for protecting a power and telemetry can 2 (one shown). A left hatch 13 is shown in an open position, while a right hatch 13 is shown in a closed or protective position.

In order to secure the hatch 13 in a locked position, the base from module 5 is provided with recesses 44 for receiving locking pins 16 configured for operation by an ROV.

Each of the hatches 13 are further provided with a handle 17 (shown on the left hatch 13) configured for operation by an ROV.

In an open position, the hatch 13 may provide a landing and a work platform for an ROV (not shown) that may be used for handling the power and telemetry can 2 during replacement thereof, or during connection and disconnection of the jumper cables, i.e. moving the sockets of the jumper cables between the connections points 11 and socket parking points 12.

A power and telemetry can socket 14 extends from the power and telemetry can 2. The socket is configured for connecting a cable to land or to a not shown remote distribution unit.

In lower right part of FIG. 2 is shown a parking socket 15 for receiving the power and telemetry can socket 14 when disconnected from the power and telemetry can 2. Shown further are ROV attachment points 45 for docketing of an ROV onto the base frame module 5 during connection of a cable from land or distribution unit into power and telemetry can socket 14, or for parking the cable on the parking socket 15. The ROV attachment points 45 may be provided with fixed or removable guideposts.

The base frame module 5 is further provided with interconnection means 6 for interconnecting base frame modules 5 to form a base frame 51 as shown in FIG. 1. In FIG. 2, the interconnection means extends perpendicular to a longitudinal axis of the frame structure 52. However, in another embodiment (not shown), the interconnection means 6 may be arranged inclined horizontally with respect to the frame structure 52. The interconnection means 6 may further be configured for interconnecting base frame modules mutually displaced vertically. In such a case, the vertical displacement between two base frame modules 5 corresponds typically to the height of the turbine house 4. This allows for adapting the base frame 51 to a terrain of the seabed S, and for optimizing the power plant 1 to prevailing current conditions.

When installing a turbine house 4 by lowering it from a surface installation vessel (not shown), the turbine house 4 may be subject to strong water currents that may drift the turbine house 4 laterally away from a vertical direction. Such a drift may complicate a correct positioning of the turbine house 4 with respect to the base frame module 5.

In order to at least reduce such drifting, so called guidewires (not shown) known per se running between the surface installation vessel and the base frame module 5, may be used. Such guide wires may be connected to the base frame module 5 by means of suitable connection points 7 which in FIGS. 2-4 are shown as protrusions 7 extending from portions of the frame structure 52. The guide wires may be slidably connected to the turbine house 4 as will be explained below in relation to FIGS. 8 and 9.

The protrusions 7 may also, together with guide pin recesses 8 arranged in the frame structure 52 as shown in FIG. 2, serve as an interconnection means for preventing lateral movement of a turbine house 4 resting on the base frame module 5. The guide pin recesses 8 further serve as guiding means for securing correct positioning of the turbine house 4 being docketed onto the base frame module 5. The guide pin recesses 8 are preferably funnel shaped.

The power and telemetry can 2 suffers from similar drifting problems during installation from a surface installation vessel to that of installing a turbine house 4 as discussed above. Therefore, guide wires (not shown) may also be utilized during installation or removal of the power and telemetry can 2 to or from, respectively, the crib 10. Such guide wires may be terminated in can guide wire connection points 9 shown in FIG. 2.

Figure 5:
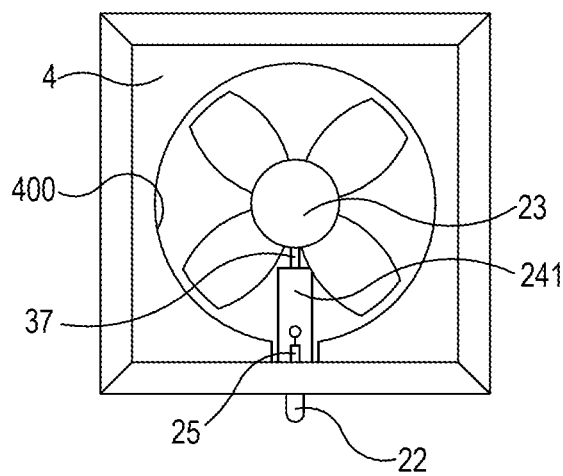
FIG. 5 shows a turbine assembly comprising a turbine apparatus arranged in a duct of a turbine house, seen from a first end portion of the turbine house.
Figure 6:
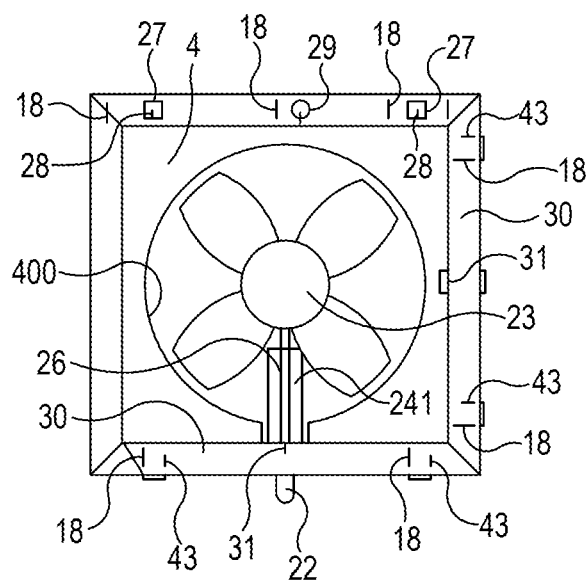
FIG. 6 shows the turbine assembly in FIG. 5 seen from a second end portion of the turbine house, wherein two of the end walls of the turbine house are provided with wall end covers shown in a closed position.
Figure 7:
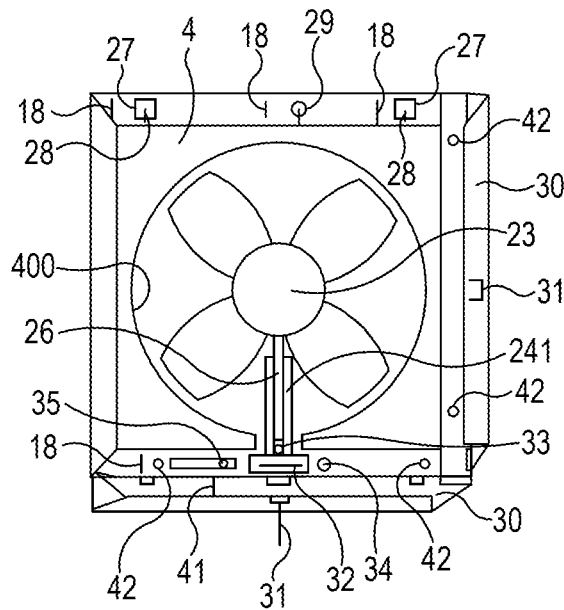
FIG. 7 shows the turbine assembly in FIG. 6 wherein the wall end covers of the turbine house are in an open position.
Figure 8:
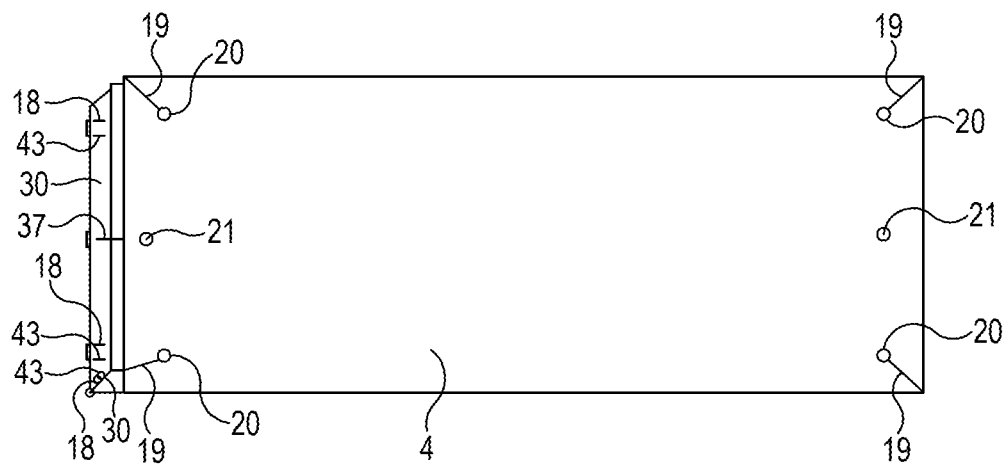
FIG. 8 shows a top plan view of the turbine house shown in FIG. 6.
Figure 9:
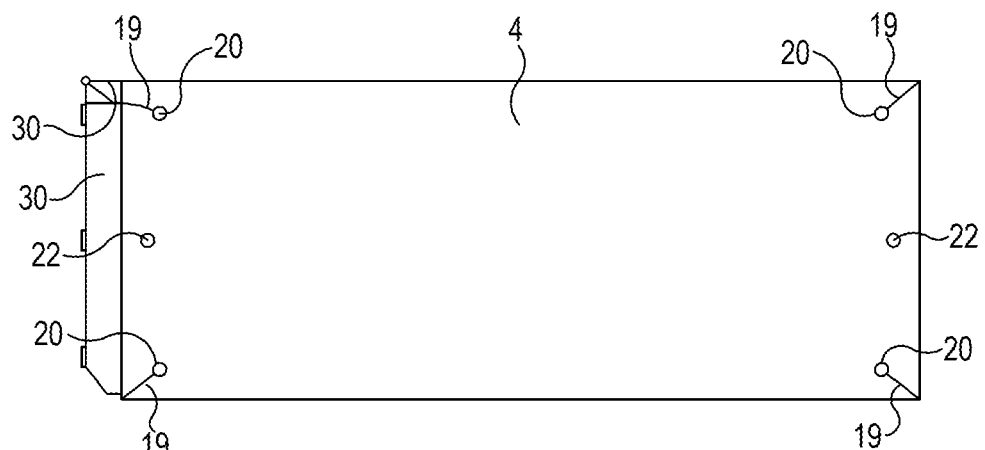
FIG. 9 shows a bottom plan view of the turbine house shown in FIG. 6.
Figure 10:
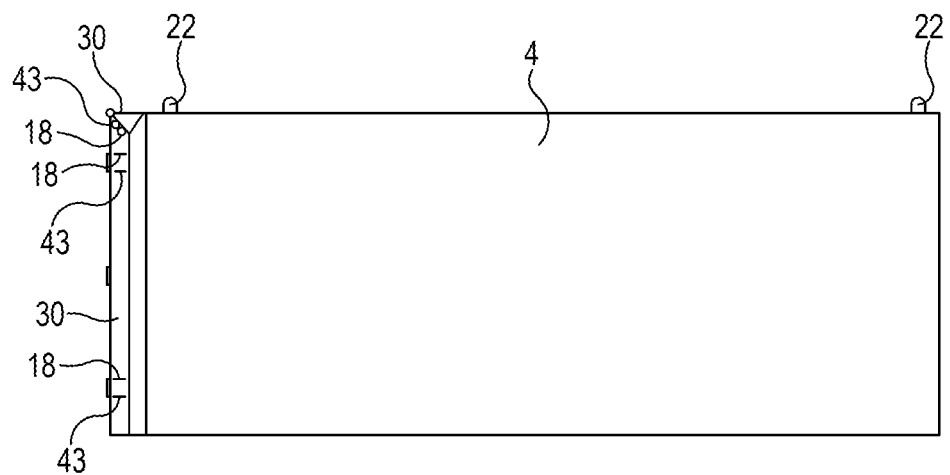
FIG. 10 shows the turbine house in FIG. 6 seen bottom up from right to left.
Figure 11:
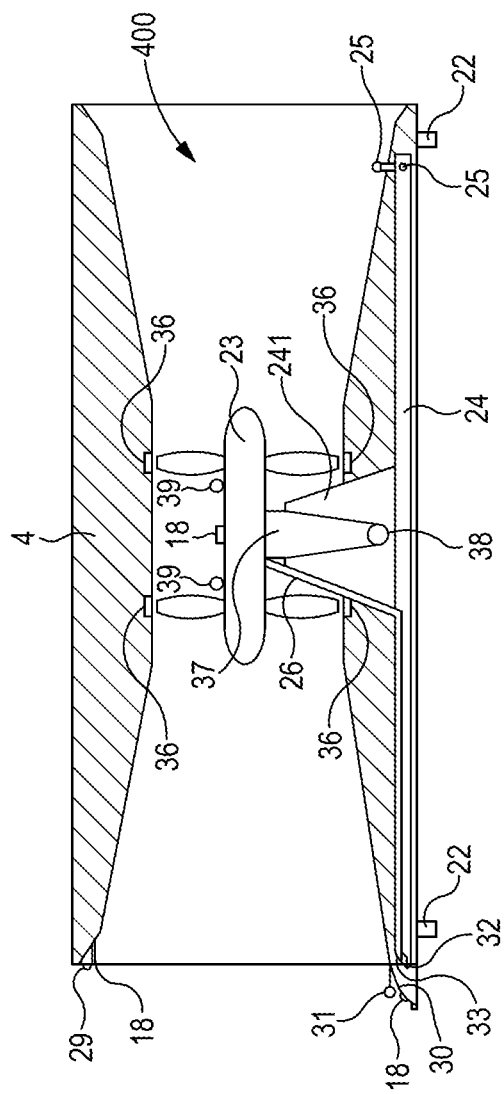
FIG. 11 is a principle sketch of the turbine apparatus arranged in an operation position in the turbine house.
Figure 12:
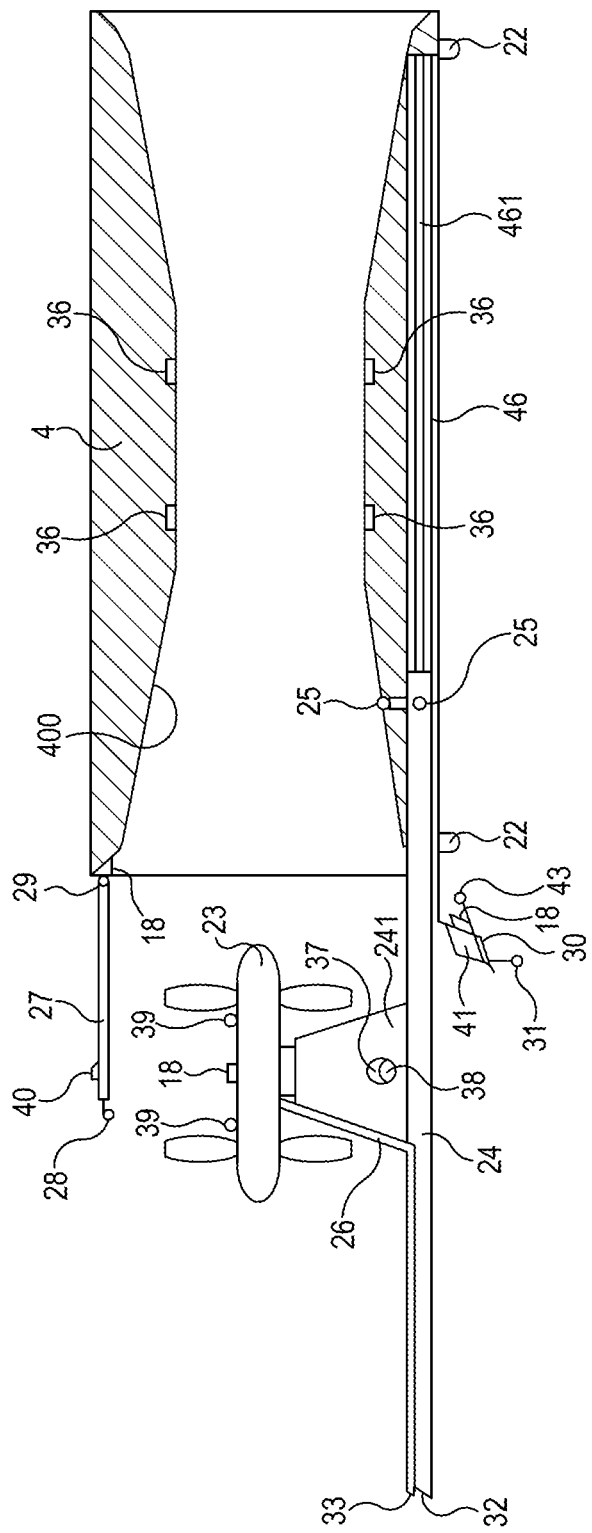
FIG. 12 shows the turbine apparatus in FIG. 11, slid to a position outside of the turbine house.

FIGS. 5 to 7 show in larger scale one of the turbine assemblies 4, 23 shown in FIG. 1. FIGS. 8 to 10 show top portion and bottom portion of the turbine house 4. FIGS. 11 and 12 is a cut-away view of the turbine assembly 4, 23. The description below relates to FIGS. 5 to 12.

The turbine assembly 4, 23 comprises a turbine house 4 defining an open-ended duct 400 for housing a turbine apparatus 23, and a connecting means 24, 241 for attaching the turbine apparatus 23 in the duct 400. The turbine apparatus 23 is in an operation position arranged centrally within the duct 400.

The connecting means 24, 241 comprises an elongated member 24. The elongated member 24 is in the embodiment shown as a rectangular beam 24. The beam 24 may typically be made from steel, but other materials capable of carrying the turbine apparatus 23 in a slid out position as shown in FIG. 12, are also conceivable. A composite material is an example of such an alternative material. The connection means 24, 241 further comprises a crib 241 fixedly connected to a centre portion of the beam 24 as best shown in FIG. 7, FIG. 11 and FIG. 12.

The beam 24 is slidably connected to the turbine house 4 in a slot 46 arranged in a bottom part of the turbine house 4. The slot 46 (best seen in FIG. 12) is in FIG. 7 shown as an inversed T-slot. An inversed T-slot is capable of preventing tilting of the beam 24 within the slot 46, and thus the crib 241.

In order to reduce friction between the beam 24 and the slot 46, one or both of the beam 24 and slot 46 may be provided with a suitable friction reducing means. In one embodiment, a surface of the beam 24 and/or the slot 46 is provided with Teflon®. In another embodiment, at least one of the slot 46 and beam 24 is provided with roller bearings (not shown).

In the embodiment shown in FIG. 11 and FIG. 12, the slot 46 extends through a left (or second) end portion of the turbine house 4, but terminates at some distance before the right (or first) end portion of the turbine house 4. Thus, the beam 24 can extend out of the turbine house 4 as shown in FIG. 12, through the second end portion only. However, in order to prevent unintended separation of the beam 24, it is provided with a selectively releasable end stop device 25. In one embodiment (not shown) the end stop device comprises dogs 25 extendable from each side portion of the beam 24. The dogs 25 are operated by turning the upper portion of the stop device 25 for example 90° clockwise to extend the extendable dogs into recesses 461 (one shown in FIG. 12) running along a portion of the slot 46. The recesses 461 are configured for allowing movement of the beam 24 between the operating position shown in FIG. 11, and the position shown in FIG. 12. If there is a need for releasing the beam 24 and crib 241 from the turbine house 4, for example for maintenance, the dogs are operated to a retracted position by turning the upper portion of the stop device for example 90° counter-clockwise, whereupon the beam 24 and crib 241 may be slid out of the slot 46. The operation of the stop device 25 is configured for ROV-operation.

In an alternative embodiment (not shown) the connection means may comprise more than one, for example two, elongate members slidably connected mutually distant to portions of the turbine house 4. The turbine apparatus 23 may in such an embodiment be connected to the elongate members by inclined connection members so that the turbine apparatus 23 is supported laterally and vertically. This alternative embodiment is particularly relevant if the turbine house 4 is made from three interconnected wall portions (instead of the four wall portions shown) wherein the turbine houses may be stacked laterally displaced and "mirrored" with respect to each other in order to allow adjacent placement of the houses side by side and on top of each other.

The second end portion of the turbine house 4 shown in FIG. 6 and FIG. 7, differs from the first end portion shown in FIG. 5. While the first end portion is substantially "plain", the second end portion is provided with a number of means as will be discussed below.

The upper wall portion of the turbine house 4 is provided with two slots, each slot for housing an elongate member 27, here in the form of a slidable arm 27 best shown in FIG. 12. Each arm 27 is provided with a locking member 28 known per se for locking the arm 27 in an extended position as shown in FIG. 12, or a retracted position within said slot. The locking member 28 may typically form part of a "key-and-slot" assembly that may be operated between a locking position preventing sliding of the elongate member 27, a sliding position allowing sliding of the elongate member 27, and a release position which allows release of the elongate member 27 from the slot in the turbine house 4. Similar to the connection means 24, 241, the elongate member 27 may thus be brought to surface for maintenance or replacement. The locking member 28 is configured for operation by an ROV.

The purpose of the arms 27 is to provide connection for a guide wire (not shown) for guiding the turbine to or from a surface vessel as discussed above. The guide wire extending from the surface vessel is releasable terminated in a connection point 40 on the arm 27 for example by means of a guide wire anchor of a type known per se operable by an ROV.

The upper wall portion of the turbine house 4 is further provided with a locking mechanism 29 interacting with a guide recess 21 provided in a portion of the upper wall as shown in FIG. 8, and with a guide pin 22 mating said guide recess 21 from a lower wall of a stacked turbine house 4. The locking mechanism 29 is of a type known per se, and may be of a similar type as the locking mechanism 28. The locking mechanism 29 may be configured for interaction with both guide pins 22 (one at each end portion of the turbine house 4). In such an embodiment, a control member (not shown) runs in a channel (not shown) in an upper portion of the turbine house 4. The locking mechanism 29 is configured for operation by an ROV.

In order to fix an ROV with respect to the turbine house 4 during an ROV operation, a number of ROV gripping bars 18 are arranged directly or indirectly to the four wall portions.

In the embodiment shown in FIG. 6 and FIG. 7 the right and the lower wall portions of the turbine house 4 are provided with protective covers 30 hingedly connected to said wall portions. In FIG. 6, the protective covers 30 are shown in a closed position. In FIG. 7, the protective covers 30 are shown in an open position. The purpose of the protective covers 30 is primarily to protect jumper cables (not shown) running along portions of said walls. The protective covers 30 are provided with handles 31 suitable for gripping by an ROV to allow opening and closing of the covers 30.

The protective covers 30 are secured in closed position by means of locking pins 43 extending from the protective covers 30 into mating recesses 42 arranged in the relevant wall portions of the turbine house 4. The locking pins 43 are configured for operating by an ROV.

The lower wall portion is provided with a releasable beam locking mechanism 35 comprising a slidable bar (not shown) for engaging a recess (not shown) arranged near an end portion of the beam 24. To prevent uncontrolled sliding of the locking mechanism 35, the lower hatch 30 is provided with a stop device 41 as shown in FIG. 7. The stop device 41 protrudes from the lower hatch 30, so that when the lower hatch 30 is in a closed position as shown in FIG. 6, the beam locking mechanism 35 is prevented from moving towards the left from its beam locking position shown in FIG. 7.

A beam handle 32 is arranged in an end portion of the beam 24 so that the sliding of the beam 24, and thus the turbine apparatus 23, can be manually operated by means of an ROV, or by means of an ROV torque tool in a manner known per se.

The connection means, i.e. the beam 24 and the crib 241, is detachable from the turbine house 4, thereby allowing maintenance or replacement of the connection means. If maintenance or replacement of the connection means 24, 241 is necessary, it will be brought to surface.

FIG. 8 and FIG. 9 show a top plan view and a bottom plan view, respectively, of the turbine house 4.

The upper wall shown in FIG. 8 and the bottom wall shown in FIG. 9 are provided with bores 20 extending through the walls. The purpose of the bores 20 is to provide guides for guide wires (not shown) used for guiding the turbine house 4 during installation on the base frame module 5 as previously discussed in relation to FIGS. 2 to 4, and to arrange a stack of two or more turbine houses 4 on top of each other. As mentioned above, the guide wires run between the base frame module 5 and typically a surface installation vessel. In order to bring the guide wires into the bores 20, the wall portions are provided with guide wire slots 19 for allowing bringing the guide wires from an outside of the turbine house 4 and into the bores 20.

The turbine apparatus 23 is provided with a protrusion 37, in FIGS. 11 and 12 shown as a fin 37 protruding from a lower part of the body of the turbine apparatus 23. The fin 37 is configured for mating the crib 241 of the connection means 24, 241.

The fin 37 may be provided with releasable locking means (not shown) for securing fixation of the turbine apparatus 23 to the crib 241. The releasable locking means may typically be a wedge device configured for wedging the fin 37 with respect to the crib 241.

The crib 241 is provided with a release hole 38 for receiving an ROV operated release device for unlocking the locking means. In one embodiment, the release device may be an ROV operated jacking device capable of urging the locking means and thus the fin 37 to a released position in the crib 241.

The duct 400 of the turbine house 4 has, as best in FIGS. 11 and 12, a flow area at the inlet and outlet of the turbine house 4 that is larger than a flow area at a mid-section carrying the turbine apparatus 23 in an operating position. A Venturi effect will thus be created, an effect that will increase the speed of the water passing the turbine apparatus 23, and thus the efficiency of the turbine apparatus 23.

The variable flow area through the duct may be provided by the turbine house 4 itself, i.e. manufactured in one piece. However, it is also conceivable to provide the variable flow area by means of an insert slid into the turbine house 4. The insert may typically, but not necessarily, be installed prior to lowering the turbine house 4 into the position of use. An insert allows optimizing the duct of the turbine house 4 to a specific turbine apparatus.

The turbine house 4 is in the embodiment shown in FIGS. 11 and 12 provided with erosion reducing means 36 for reducing erosion in the inner wall of the turbine house 4 facing the tips of the vanes of the turbine apparatus 23. The erosion reducing means 36 is in the embodiment shown bands 36 arranged in two recesses provided in the inner surface of the turbine house 36. The erosion reducing means 36 may be made from any suitable material, such as for example steel. Erosion reducing means 36 are particularly useful when the turbine house 4 is made from concrete.

The band 36 may have a width exceeding the width indicated in FIGS. 11 and 12. In one embodiment (not shown) the band 36 is one band or inlay having a width exceeding the distance between tips of the first rotor disc and the second rotor disc of the turbine apparatus 23.

A cable running along the crib 241 and beam 24 between a jumper cable socket 33 and the turbine apparatus 23, is mechanically protected by means of a protective pipe 26. A jumper cable (not shown) provides connection between the jumper cable socket 33 and the power and telemetry can 2 shown in FIG. 2. A parking socket 34 for receiving an end portion of the jumper cable when the jumper cable is disconnected from the turbine apparatus 23, i.e. the socket 33, is shown in FIG. 7.

FIGS. 13a-13d show an example of installation of seabed support 3 for supporting a base frame module 5 to be interconnected with another base frame module 5.

Figure 13B:
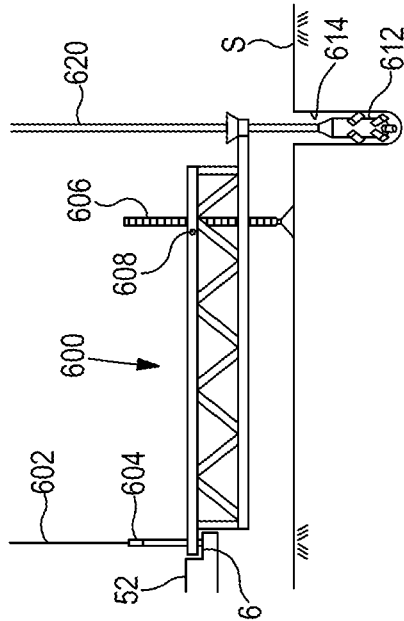
FIGS. 13*a*-13*d* show steps in an operation of providing a seabed support.
Figure 13D:
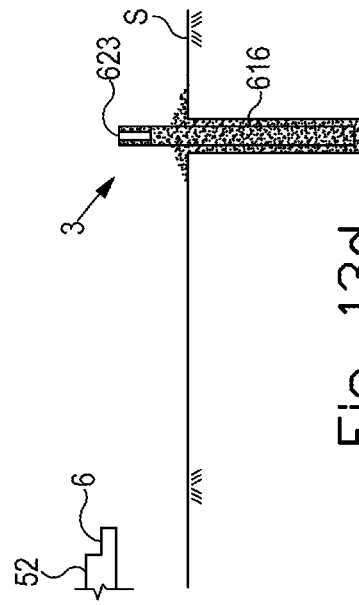
Figure 13A:
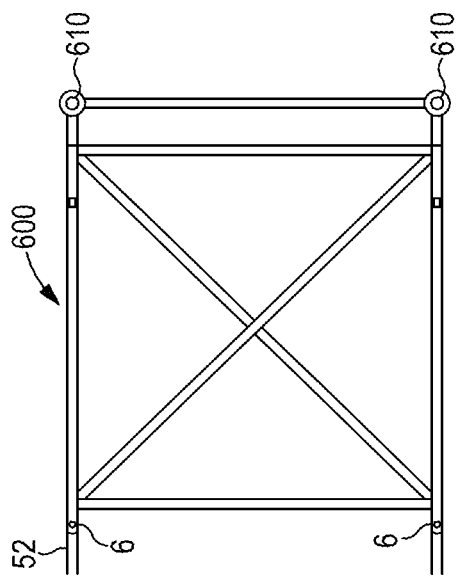

In FIG. 13a, a rigid drilling frame 600 has been lowered from the surface and connected to interconnection means 6 of the frame structure 52 of the base frame module 5. The drilling rig frame 600 is provided with guide funnels 610. The dimensional layout of the drilling rig frame 600 corresponds to the dimensional layout of the base frame module 5 to be supported by the seabed supports 3 and an already installed base frame module. The positioning of the guide funnels 610 is adapted to the base frame module 5 such that a correct position of the seabed supports 3 is achieved.

FIG. 13b shows the drilling frame 600 in FIG. 13a seen from below. In FIG. 13b, the drilling frame has been lowered from the surface on guide wires 602 secured to the base frame 5 by means of guide posts 604 known per se.

The drilling frame 600 is further provided with a jack-up leg 606. The jack-up leg 606 is vertically adjustable by means of an ROV jack-up device comprising a gear 608 operated by an ROV. The gear 608 interacts with a pitch rack arranged on the jack-up leg 606. By means of the jack-up leg 606 and gear 608, the drilling frame 600 is levelled with respect to the base frame module 5 to which the drilling frame 600 is connected.

The guide funnels 610 serves as guides for inter alia a drill bit 612 for drilling holes 614 into the seabed S. The drill bit 612 is lowered from the surface on a drill string 620. In FIG. 13b, drilling of the hole 614 has commenced.

Figure 13C:
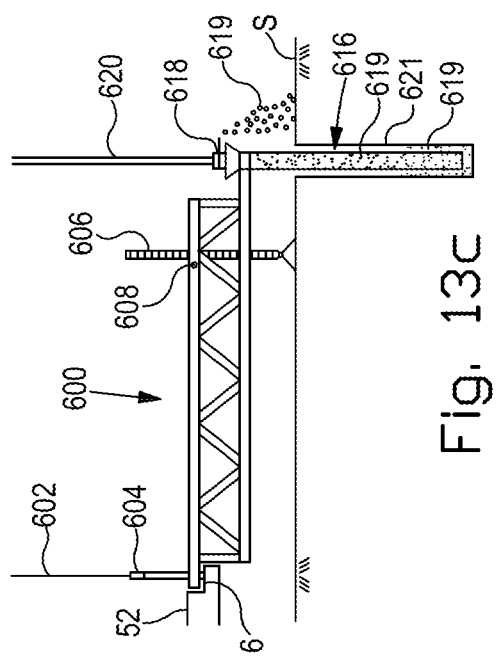

In FIG. 13c the drill bit 612 has drilled a hole in the seabed S, and a casing 616 has been lowered into the hole 614 by means of a running tool 618. The running tool 618 is connected to an end portion of a drill string 620.

The running tool 618 comprises a valve for allowing discharge of concrete 619 when the casing 616 has been filled up with concrete 619. The valve is initially in an open position. When the casing 616 is completely filled with concrete 619, the valve is closed. Continued filling of concrete 619 after closing the valve will result in filling of an annular space 621 between the casing and a wall of the hole 614. When the annular space 621 is filled with concrete 619, the supply of concrete is stopped. The casing 616 is secured in correct position in the hole 614.

After some curing of the concrete 619, the running tool 618 and the drill string 620 is pulled to surface.

Thereafter, when the desired number of supports 3 (two shown in the embodiment shown) has been provided, the drilling frame 600 is disconnected from the base frame structure 52 and hoisted to surface. The seabed supports 3 are now ready for supporting a new base frame module (not shown) that will be lowered from the surface and connected to interconnection means 6 of the frame structure 52 of the base frame module 5, and to the seabed support 3.

The seabed support 3 is provided with a receptacle 623 for receiving a guide pin (not shown) extending from a lower portion of the base frame module 5.

From the above description, a person skilled in the art will appreciate that the present invention relates to a scalable, effective underwater power plant particularly suitable for harvesting energy from tidal currents. The underwater power plant facilitates for individual maintenance of turbine apparatuses in power plants comprising more than one turbine apparatus 23, while the remaining apparatuses 23 of such a power plant remain in production. The power plant is configured for ROV-operations, resulting in effective and low costs related to installation and maintenance operations.

Figure 14:
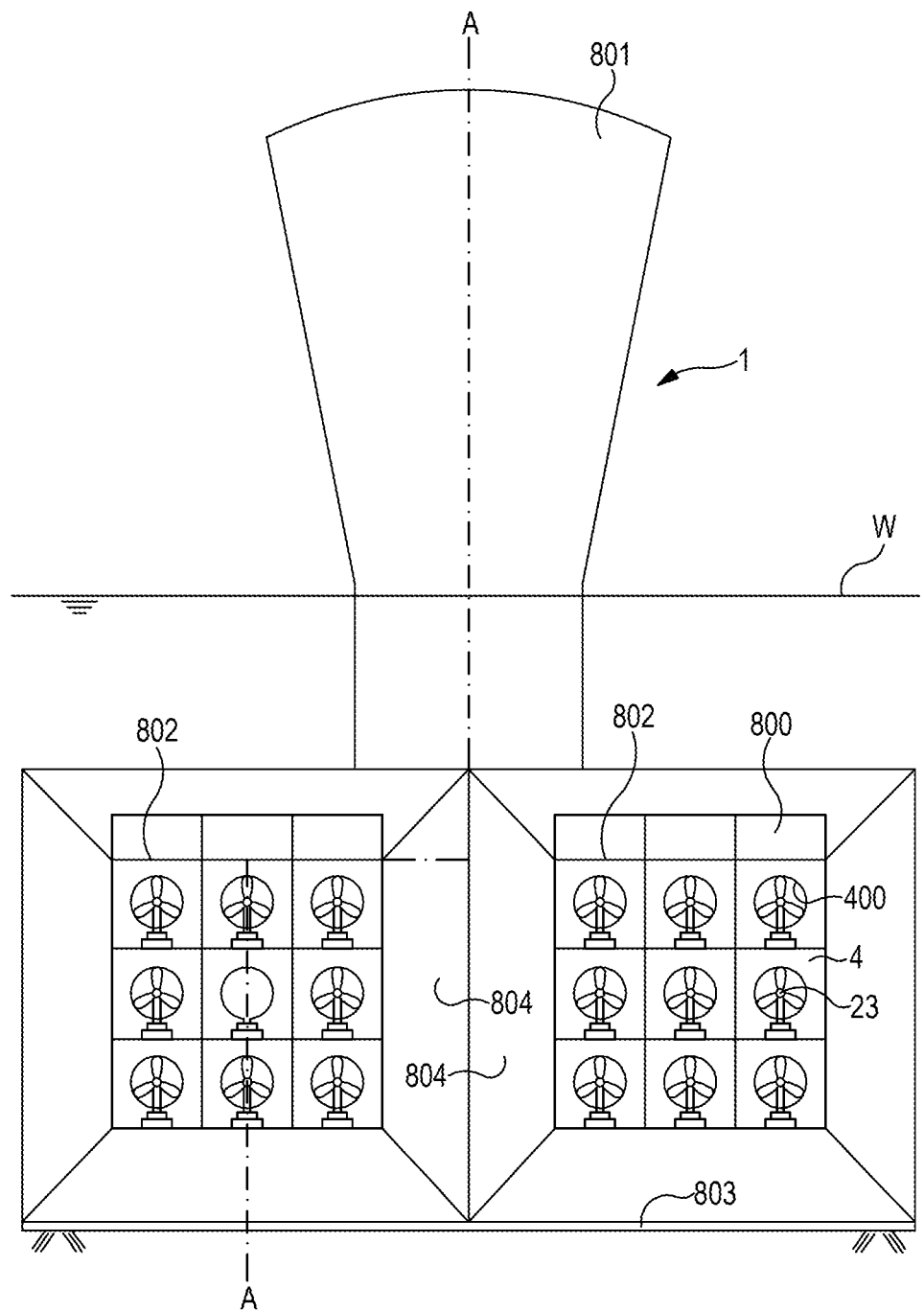
FIG. 14 shows a view of an automated underwater power plant according to the present invention, wherein a plurality of turbine assemblies comprising turbine apparatuses arranged in turbine houses, are arranged in rows and columns.

FIGS. 14 to 28b show an example of an automated underwater power plant system 1 according to one aspect of the present invention wherein a plurality of turbine assemblies 4, 23 forming the turbine blocks 802 (two shown in FIG. 14) comprising turbine apparatuses 23 arranged in turbine houses 4 in rows (three shown in FIG. 14) and columns (three shown in FIG. 14).

In FIG. 14, the underwater power plant system 1 is sufficiently submerged below a water surface W to allow for passage of surface vessels (not shown). The underwater power plant system 1 comprises a tower 801 that rises above water surface W. The purpose of the tower 801 is to house the electronics of the power plant and any other facilities (not shown) such as ballast system, a crane deck, a storing space and a workshop for maintenance of the turbines of the power plant.

A power plant 1 may typically comprise several turbine blocks 802 arranged side by side, as shown in FIG. 14, and a central tower 801 for housing the facilities of the power plant.

Each turbine block 802, comprising a plurality of turbine assemblies 4, 23, may be placed in the central portion of a Venturi duct 804 for better utilisation of the tidal power plant 1.

By sliding the turbine apparatus 23 within the venture shaped duct 400 of the turbine house 4, the turbine apparatus 23 may be positioned in a portion of the turbine house 4 having a desired speed of the water flow. The present invention may work equally well in neap and spring tides as the turbine apparatus 23 may be configured for automatic positioning within the duct 400 for optimal power production.

The underwater power plant 1 may typically be built as one unit or solid construction that is configured for being floated from an onshore building site to an operating site offshore. At the site of operation, the power plant 1 is ballasted down by means of gravity to rest on a base plate 803 on the seabed S. Jumper cables from the turbine apparatuses 23 may be routed through integrated pipe channels 821 (see FIG. 28*a*) into an electric switchboard room of the power plant. Such an electric switchboard room may be placed above water surface W in the tower 801 of the power plant 1.

The turbine blocks 802 (two shown in FIG. 14) house a plurality of turbine assemblies 4, 23. The width and height of each of the turbine blocks 802 in FIG. 14 may typically be approximately 25 m×25 m while the length may typically be approximately 25 m. However, other dimensions are also conceivable without departing from the scope of invention.

Figure 15:
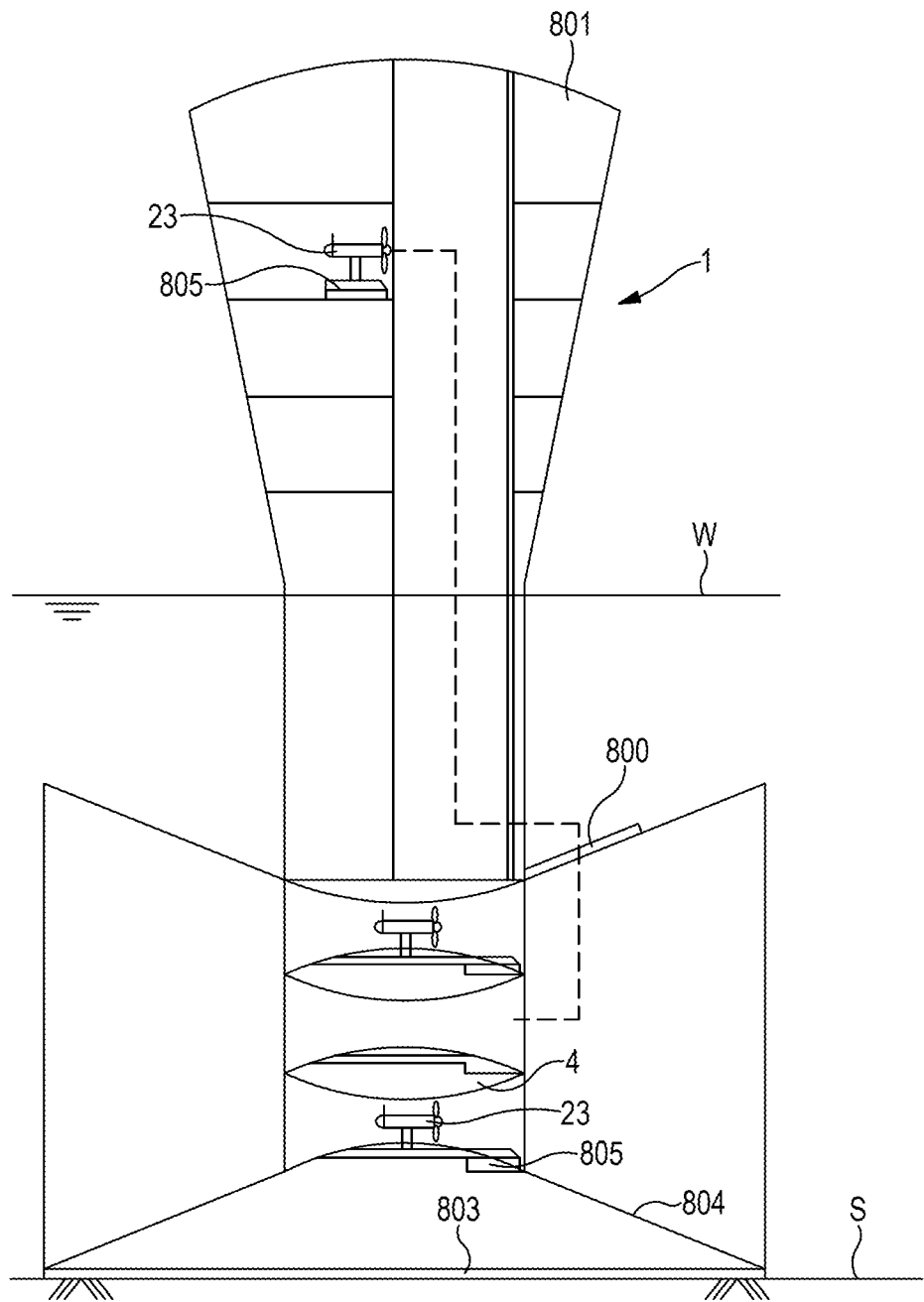
FIG. 15 shows a cut seen from left to right through A-A in FIG. 14.

FIG. 15 shows a cut seen from left to right through A-A in FIG. 14.

In FIG. 15 a turbine member skid 805 placed in the tower 801 is ready to be picked up by a pick-up robot 806 (shown in FIG. 18*a*) to be brought down to the centre turbine house 4 in the left turbine block 802 shown empty in FIG. 14.

Figure 16:
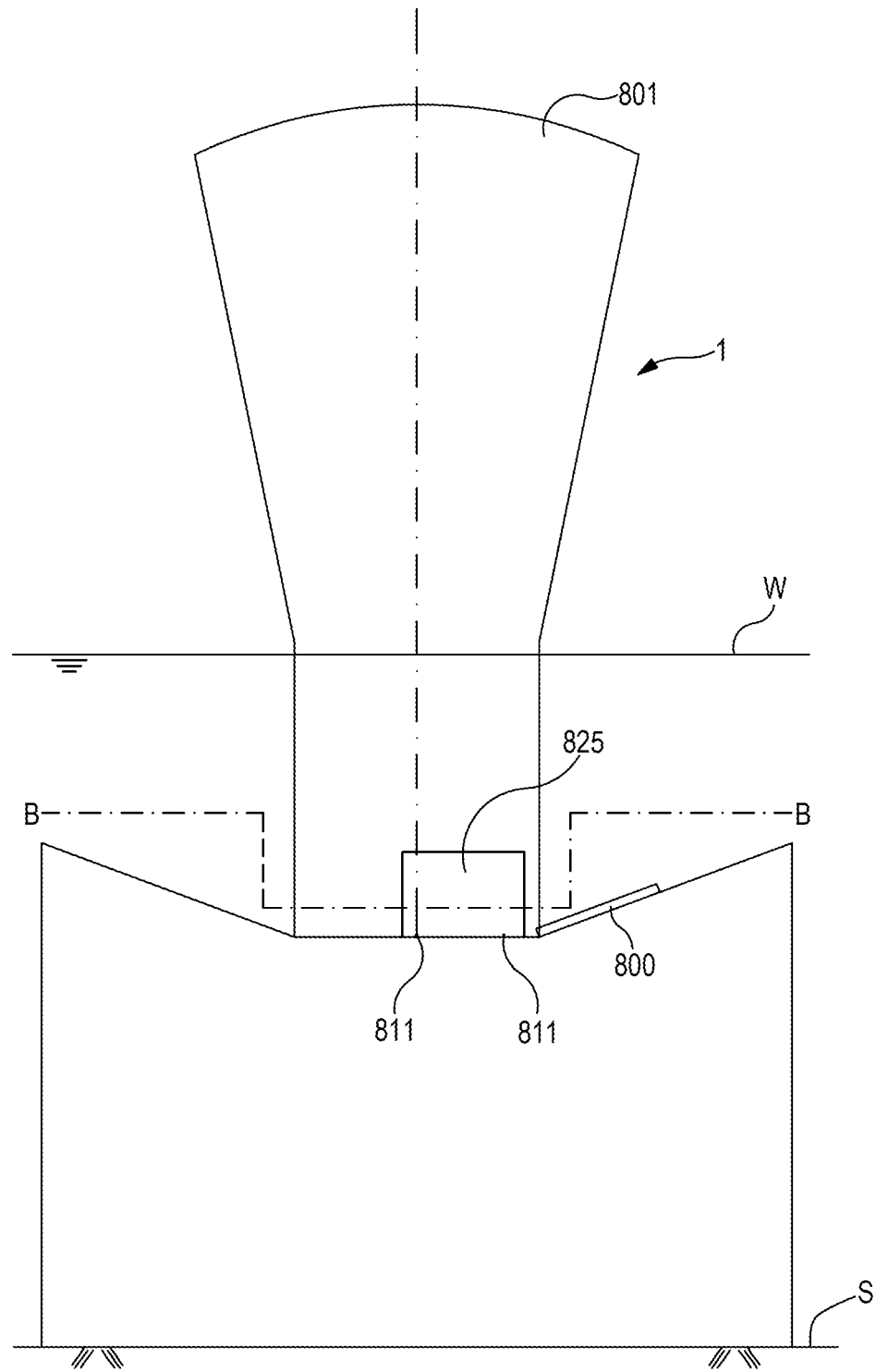
FIG. 16 shows a side view of the underwater power plant shown in FIG. 14, seen from left to right.

FIG. 16 shows a side view of the underwater power plant 1 shown in FIG. 14, seen from left to right.

Figure 17:
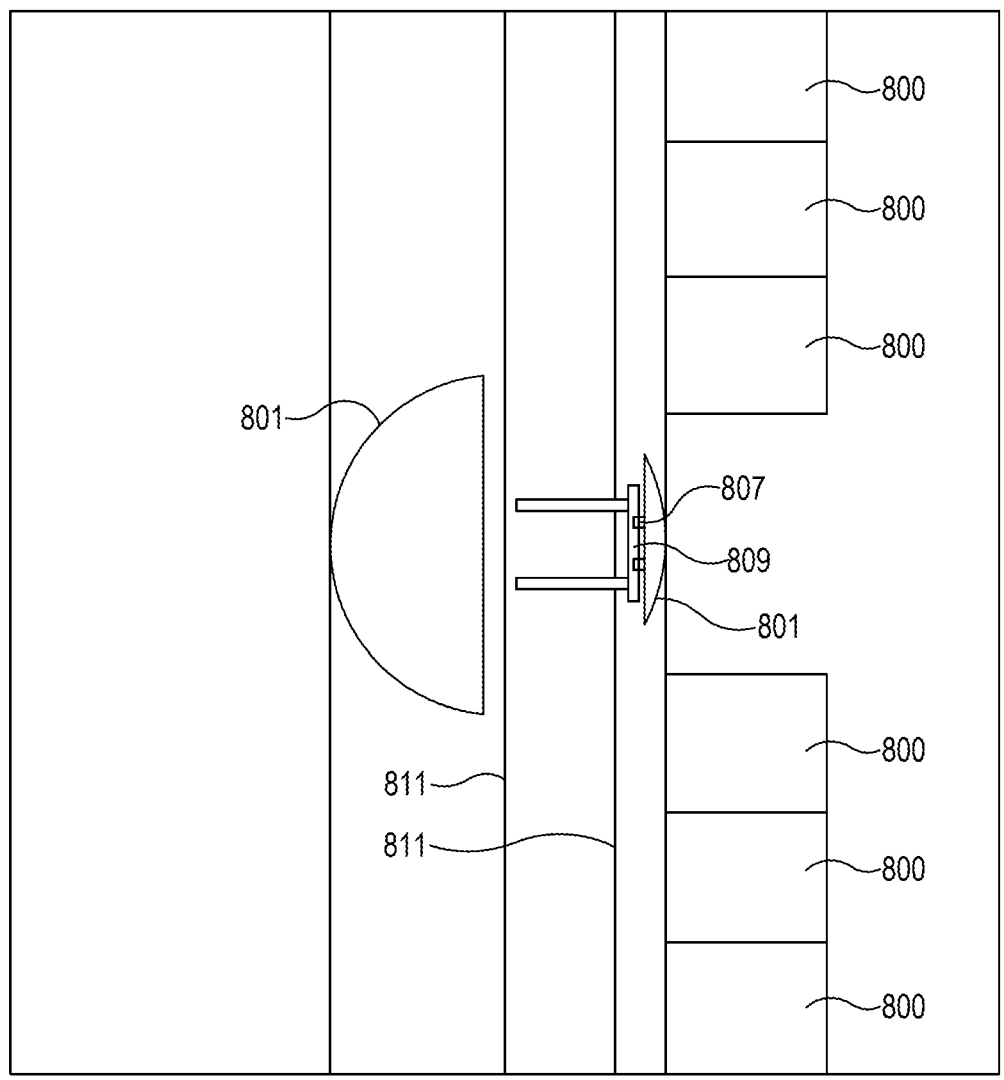
FIG. 17 shows a top plan view, seen through B-B in FIG. 16.

FIG. 17 shows a top plan view, seen through B-B in FIG. 16. A vertical forklift 809 is placed in a pickup/delivery position at the bottom of the tower 801. A rail guide 811 runs in parallel to and on top of the turbine blocks 802 (see FIG. 14) of the power plant 1. The rail guide 811 runs from one end to the other end of the power plant 1 through a tunnel opening 825 shown in FIG. 16 and through tower 801.

FIGS. 18*a*-24*b* show steps in an operation of moving a turbine member skid 805 from the tower 801 of the power plant 1 to one of the turbine houses 4 of the power plant 1. The moving path is indicated by dotted lines in FIG. 15.

Figure 18A:
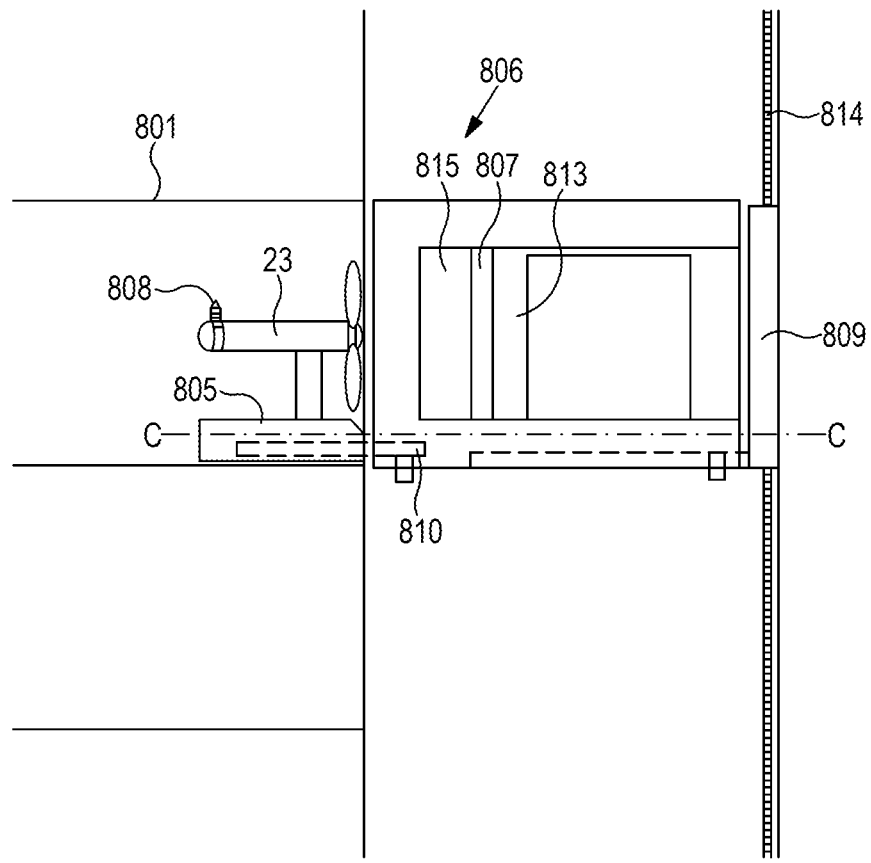
FIGS. 18a-24b show steps in an operation of moving a turbine member skid from the tower of the power plant to one of the turbine houses of the power plant, wherein FIGS. (18-24)a show side views of a pick-up robot, seen from left to right, and FIG. (18-24)b show top plan views of the pick-up robot, seen through C-C to I-I, respectively.
Figure 18B:
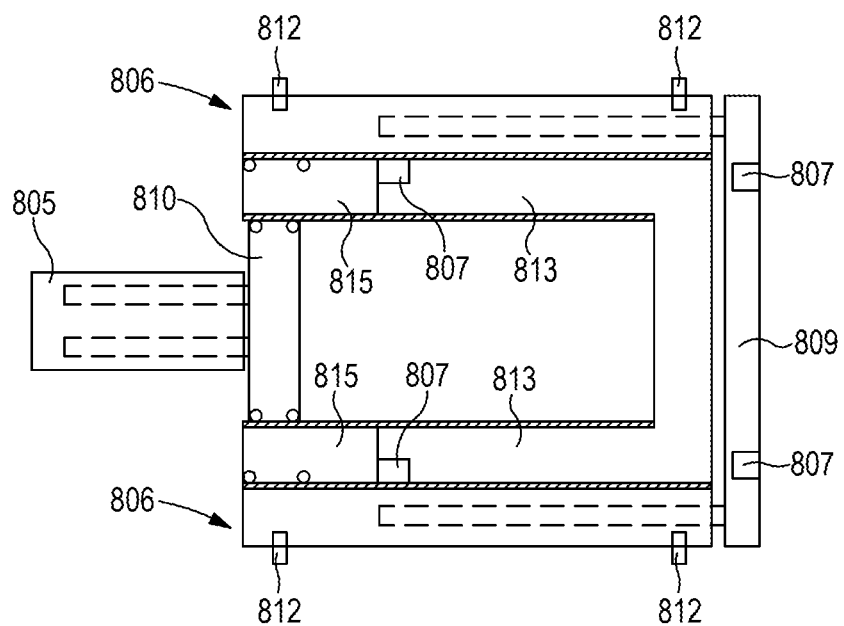

In FIG. 18*a*, the pick-up robot 806 is levelled up with the turbine member skid 805 by means of the vertical forklift 809. The pick-up robot 806 has extended a fork 810 of the forklift 809 to lift the turbine member skid 805 off a deck of the tower. FIG. 18*b* shows in larger scale a top plan view of the pick-up robot 806, seen through C-C in FIG. 18*a*.

Figure 19A:
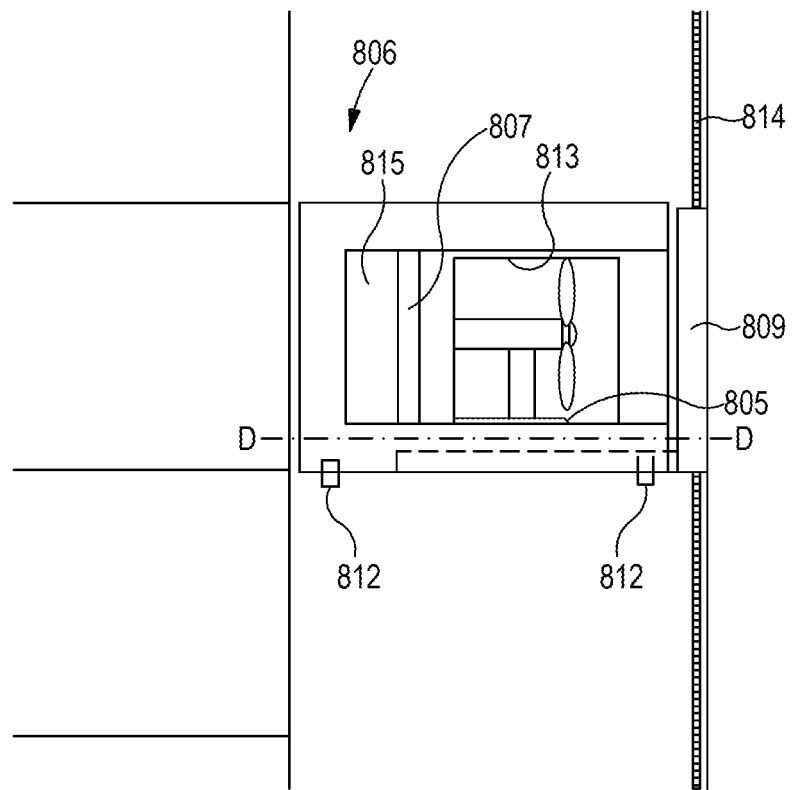
Figure 19B:
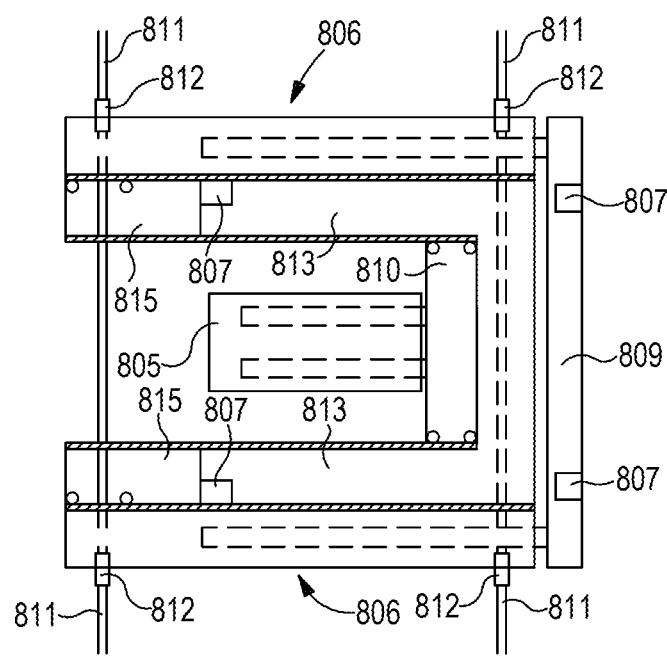

In FIG. 19*a*, the pick-up robot 806 has retracted its fork 810 holding the turbine member skid 805. FIG. 19*b* shows in a lager scale a top plan view of the pick-up robot 806, seen through D-D in FIG. 19*a*.

Figure 20A:
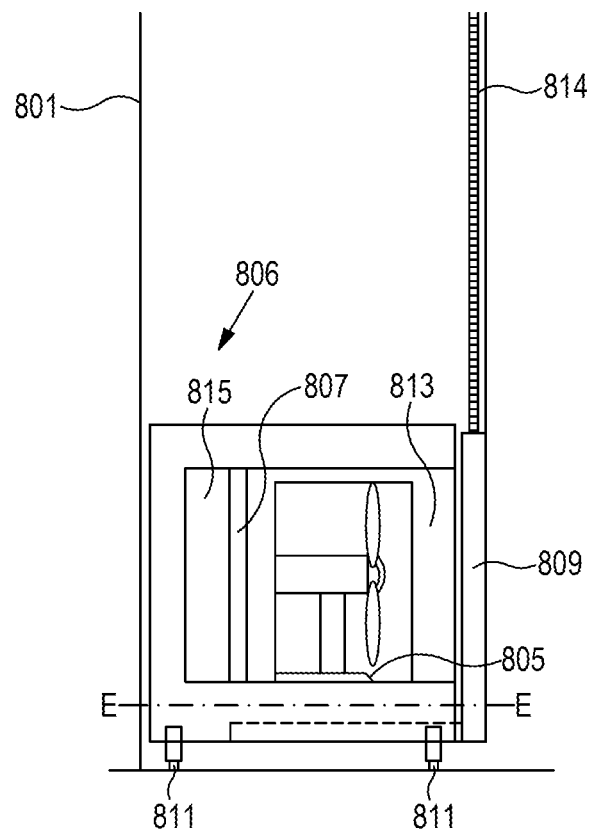
Figure 20B:
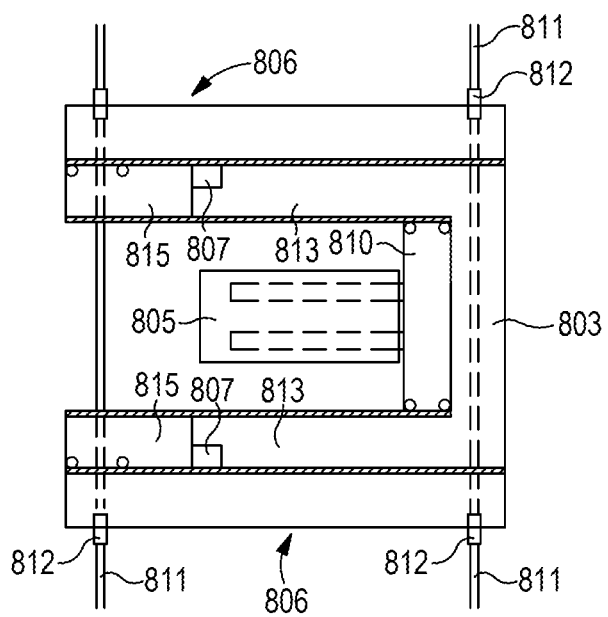

In FIG. 20*a*, the vertical forklift 809 has descended down a pitch rack 814 in the tower 801 and placed the pick-up robot 806 on the rail guide 811. The rail guide 811 is best shown in FIG. 17. FIG. 20*b* shows in larger scale a top plan view of the pick-up robot 806, seen through E-E in FIG. 20*a*.

Figure 21A:
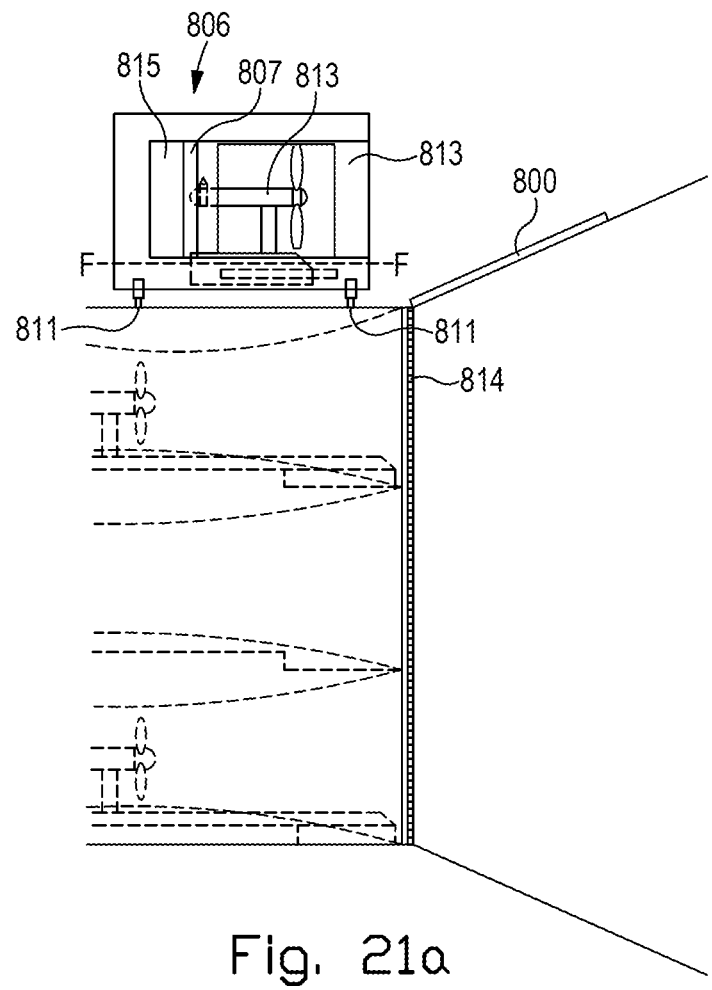
Figure 21B:
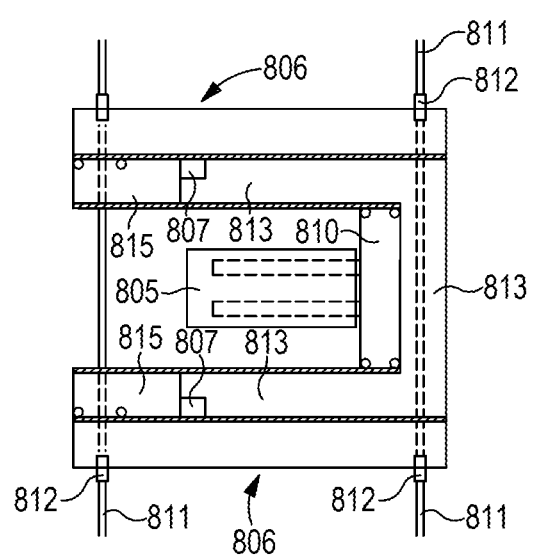

In FIG. 21*a*, the pick-up robot 806 has moved horizontally on the rail guide 811 to align up with the designated row of turbine houses 4. FIG. 21*b* shows in larger scale a top plan view of the pick-up robot 806, seen through F-F in FIG. 21*a*.

Figure 22A:
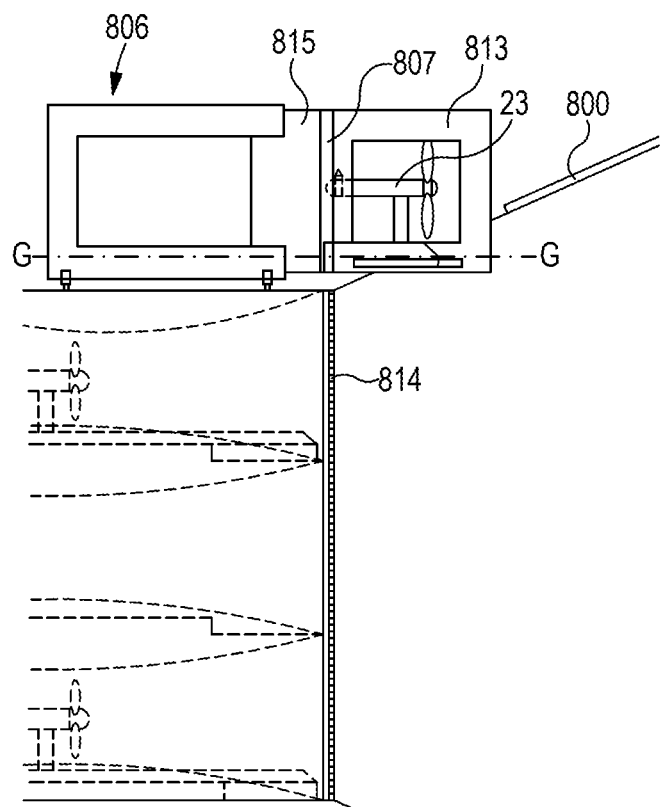
Figure 22B:
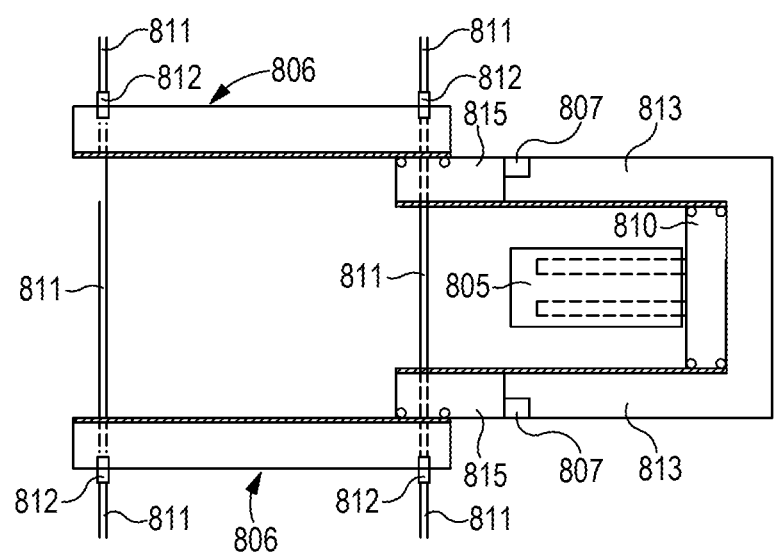

In FIG. 22*a*, the hatch 800 is open and the pick-up robot 806 has extended main slides 815 and 813 to align up with a pitch rack drive housing 807 with a vertically extending pitch rack 814 of the actual row of turbine houses 4. FIG. 22*b* shows in larger scale a top plan view of the pick-up robot 806, seen through G-G in FIG. 22*a*.

Figure 23A:
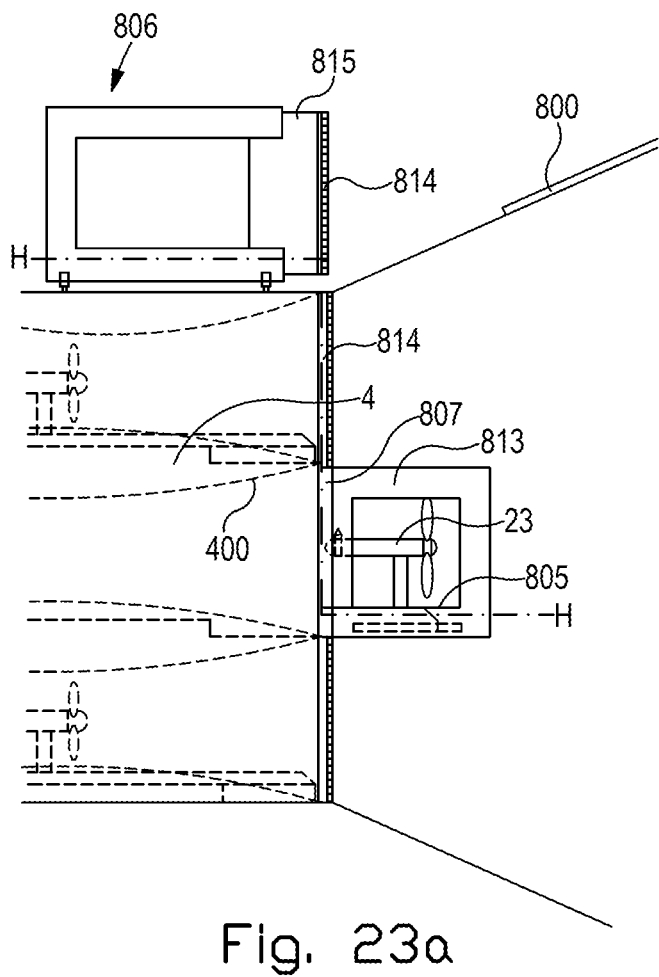
Figure 23B:
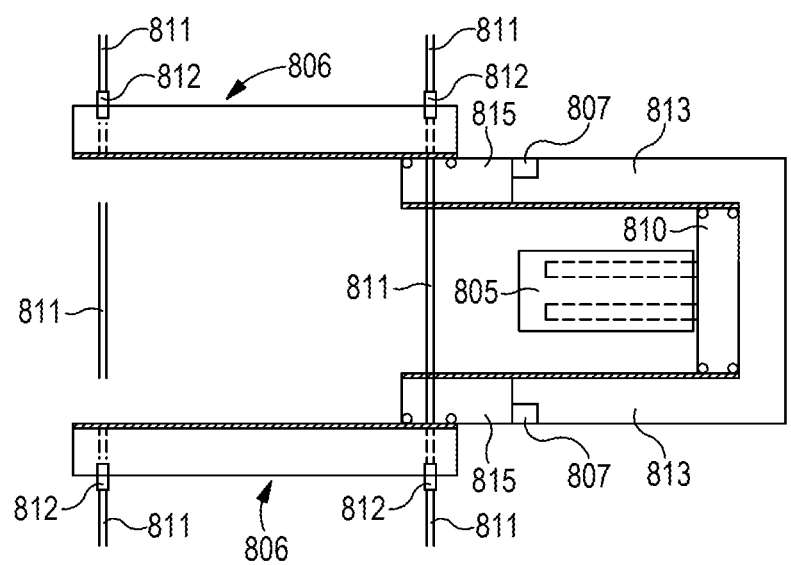

In FIG. 23*a*, the pick-up robot 806 main slide 813 is by means of the pitch rack drive housing 807 vertically separated from main slide 815 and aligned horizontally with the actual turbine house 4. FIG. 23*b* shows in a larger scale a top plan view of the pick-up robot 806, seen through H-H in FIG. 23*a*.

Figure 24A:
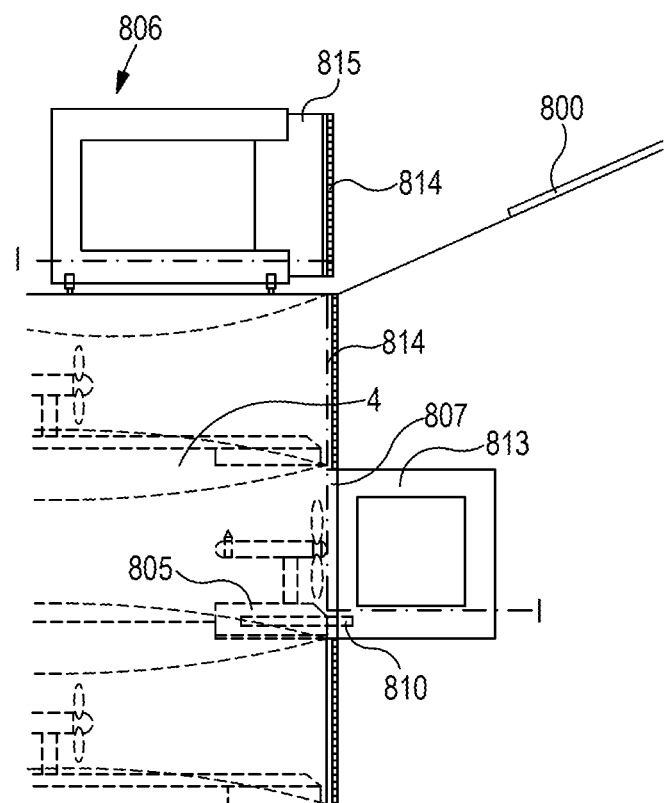
Figure 24B:
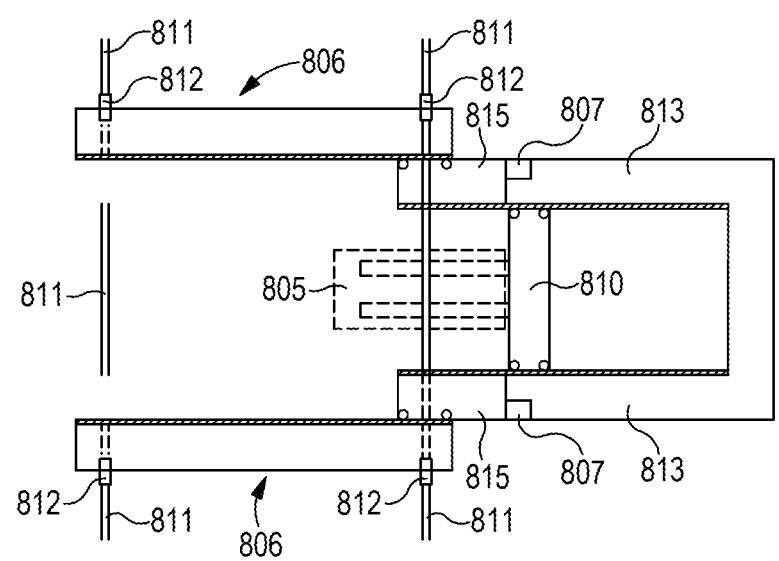

In FIG. 24*a*, the fork 810 of the pickup robot 806 has been extended and the turbine member skid 805 has been slid horizontally into the turbine house 4. After the turbine member skid 805 has been slid into position in the turbine house 4, the turbine member skid 805 is locked to the turbine house 4 by means of an end lock 25 (shown in FIG. 25*b*) activated by means of the fork 810. The fork 810 is then retracted and the pick-up robot 806 is ready for next task. FIG. 24*b* shows in a larger scale a top plan view of the pick-up robot 806, seen through I-I in FIG. 24*a*.

The purpose of the end lock 25 is to prevent unintended separation of the turbine member skid 805 from the turbine house 4.

The automated pick-up robot 806 may be powered and controlled by a main and an auxiliary battery pack, hereinafter denoted aux battery pack, and a main and auxiliary control-can (not shown). The main battery pack and main control-can are placed in a first portion of the pick-up robot 806 and the aux battery and aux control-can are placed in a second portion of the pick-up robot 806 main slide 813. The pick-up robot 806 will use facility (not shown) of the tower 801 of the power plant 1 to charge the battery pack and to upload/receive new task from a control centre of the power plant 1.

The automated pick-up robot 806 main slides 815 and 813 can, as described above, be vertically separated from each other to allow the main slide 815 to rest on top of the turbine block 803 while the main slide 813 moves vertically down the row of turbine houses 4 to the designated column of turbine houses 4 for installing the turbine member skid 805. Therefore, also the pick-up robot 806 main slide 813 may be powered and controlled by its own internal battery pack and the control-can (not shown) to avoid cables running between the main slides 815, 813.

Thus, the pick-up robot is a separate vehicle movable in an x-, y- and z-axis by means of lifts, rails and the slide system for picking up a turbine member skid or placing a turbine member skid at a desired location.

FIGS. 25*a*-*c* show various views of the turbine member skid 805. In FIG. 25*a*, the turbine member skid 805 and the turbine apparatus 23 is seen from the aft end. In FIG. 25*b*, the turbine member skid 805 and the turbine apparatus 23 is seen form left to right. FIG. 25*b*1 shows in a larger scale a detail 25*b*1 of FIG. 25*b*. FIG. 25*c* shows a top plan view seen through J-J in FIG. 25*b*.

In FIG. 25*b*1, a connector funnel 817 is shown in more details and shows a receptacle connector cable 818 that runs to a power/telemetry-can (for example of the type shown in FIG. 2) placed in the turbine member skid 805. The cables running from the power telemetry can, which is placed in the turbine member skid 805 of the turbine apparatus 23, may be mechanically protected by means of a slidable cable belt. A wet-mate receptacle connector 819 is connected with the connector funnel 817 that has a self-orientation track 820 for entering of a wet-mate connector stab 823 by means of a self-alignment fin 822 as shown in FIG. 28*b*, into a receptacle connector 819 shown in FIG. 25*b*1.

FIGS. 26*a*-27*a* show the turbine apparatus 23 slid to extreme end positions in the turbine house 4. Further, a cleaner arm 808 in FIGS. 26*a*-27*a* is shown in a retracted position, while the cleaner arm 808 is shown in an extended position in FIG. 28*a*. The cleaner arm 808 is configured for rotating 360 degrees around its longitudinal axis and is extendable/retractable to reach the surface, i.e. the inner walls, of the duct 400. The cleaner arm 808 is connected to a high-pressure jetting pump outlet (not shown) mounted on the rear end of the turbine apparatus 23 adjacent the cleaner arm 808. Thus, the cleaner arm 808 and the high-pressure jetting pump moves together with the turbine apparatus 23 within the duct 400. FIGS. 26b and 27b show a top plan view of the turbine member skid 805, seen through K-K and L-L in FIGS. 26a and 27a, respectively.

Figure 26A:
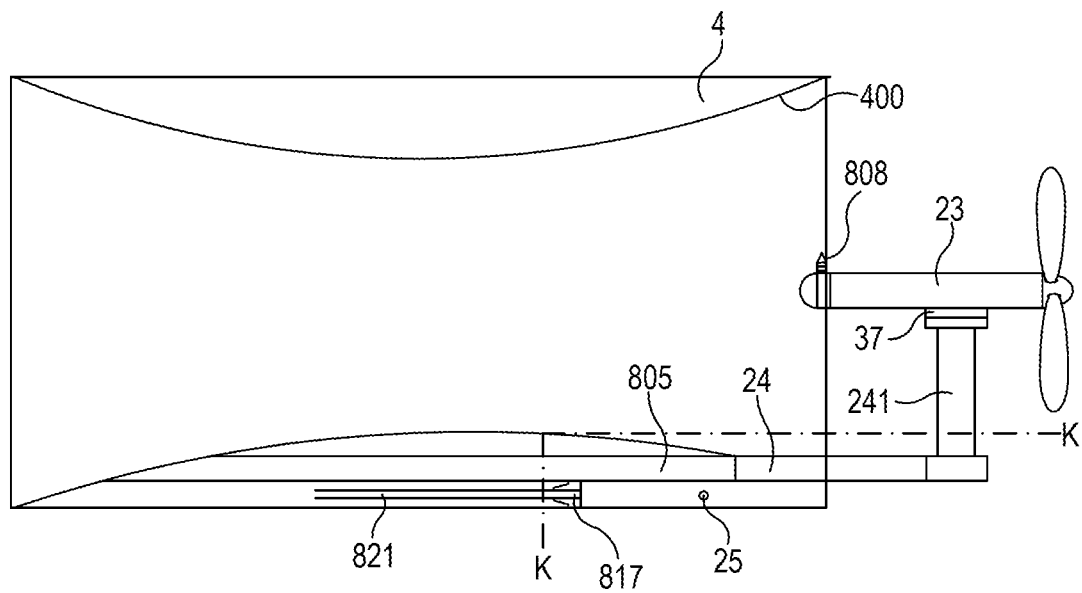
FIGS. 26a-27b show in FIGS. 26a and 27a side views of the turbine apparatus slid to each end position, respectively, of the turbine house; and in FIGS. 26b and 27b a top plan view of the turbine member skid, seen through K-K to L-L in FIGS. 26a and 27a, respectively.
Figure 26B:
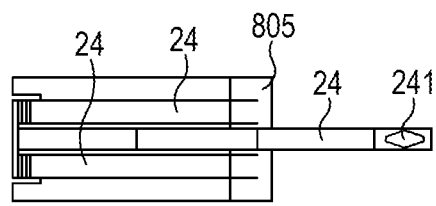
Figure 27A:
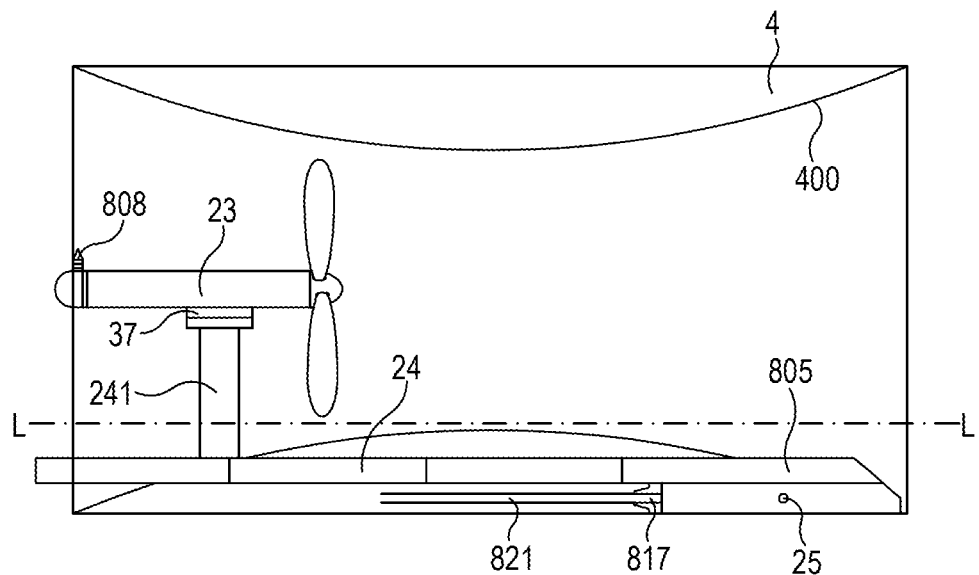
Figure 27B:
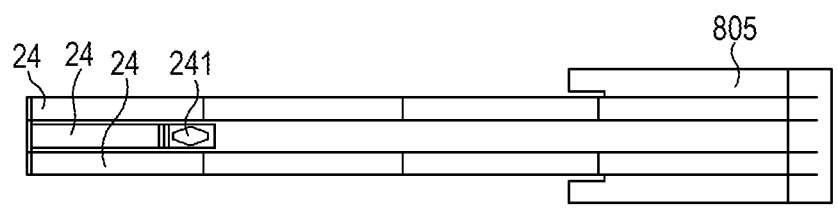

FIGS. 26a and 27a further show the member skid 805 in a lower portion of a turbine house 4, while FIGS. 26b and 27b shows a top plan view of a telescopic member 24 that is configured for slidable connection to the turbine member skid 805. The turbine member skid 805 has a first portion which in a position of use is connected to a wall of the turbine house 4 by means of an end lock 25, and a second portion which in a position of use, is slidably connected to a first portion of the skid 805 in a telescopic manner.

Figure 28A:
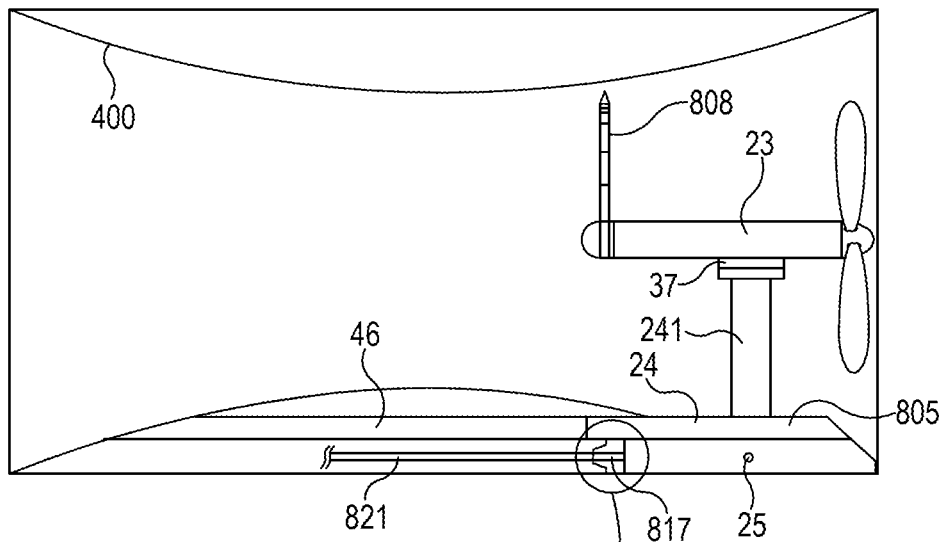
FIG. 28a shows a side view of a retracted turbine member skid placed in a turbine house with an extendable cleaner arm in an extended position.
Figure 28B:
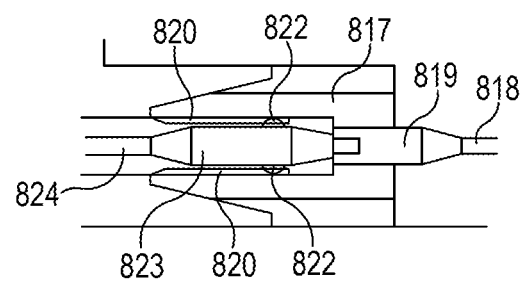
FIG. 28b shows in a larger scale a connector funnel housing a connector stab connected with a receptacle connector.

FIG. 28b shows in a larger scale the connector funnel 817 and the wet-mate connector stab 823 connected with the wet-mate receptacle connector 819. A jumper cable 824 runs through integrated pipe channels 821 (see FIG. 28a) to an electric switchboard room (not shown) in the tower 801.

The telescopic member 24 is in the embodiment shown in FIG. 28a guided in a slot 46 arranged in a bottom portion of the turbine house 4. The turbine apparatus 23 may be fixedly connected to a protrusion 37 that is 180 degree rotatable in the crib 241. The telescopic member 24 supports the turbine apparatus 23 both laterally and vertically.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. An underwater power plant for converting kinetic energy of flowing water into electricity, the power plant comprising at least one turbine house defining a duct for housing a turbine apparatus, and a connecting means for attaching the turbine apparatus in the duct, the connecting means comprising at least one member slidably connected to the at least one turbine house for allowing sliding of the turbine apparatus out of, into or within the at least one turbine house, wherein the at least one member is an elongate member having a length exceeding an axial length of the turbine apparatus, and wherein the elongate member is capable of attaching the turbine apparatus to the at least one turbine house also when the turbine apparatus is slid axially to a position outside of the at least one turbine house, to allow vertical lifting of the turbine apparatus.

2. The power plant according to claim 1, wherein the at least one member comprises a crib for receiving a protrusion from a body of the turbine apparatus.

3. The power plant according to claim 1, wherein the turbine apparatus is bi-directional.

4. The power plant according to claim 3, wherein the turbine apparatus is provided with a first rotor disc and a second rotor disc, both of which are provided with rotor blades, the first rotor disc is arranged for counter rotating with respect to the second rotor disc.

5. The power plant according to claim 1, wherein the at least one turbine house has at least three wall portions having an outer surface and an inner surface, the wall portions being interconnected for forming the duct having an inlet and an outlet.

6. The power plant according to claim 5, wherein at least one of the wall portions is provided with a slot for slidably connecting and guiding the at least one member in the at least one turbine house.

7. The power plant according to claim 1, wherein a flow area at an inlet and an outlet of the at least one turbine house is larger than a flow area at a section between said inlet and outlet in the direction of flow.

8. The power plant according to claim 1, wherein the at least one turbine house comprises at least two turbine houses, an outer surface of the at least two turbine houses being complementary adapted to each other for allowing adjacent placement of the at least two turbine houses side by side and/or on top of each other.

9. The power plant according to claim 8, wherein the at least two turbine houses are provided with engagement means comprising mating recesses and guide pins for interlocking neighbouring turbine houses.

10. The power plant according to claim 1, wherein the turbine apparatus is configured for automatic operation, the turbine apparatus further comprising a sensor device for sensing at least one of rotation speed, torque, power, current and voltage, the sensor device being in communication with a control system configured for controlling driving means for sliding the elongate member in the duct to bring the turbine apparatus to an optimal position with respect to power production, wherein the driving means comprise a remotely operated vehicle (ROV).

11. The power plant according to claim 1, wherein the turbine apparatus is rotatable 180° with respect to the elongate member.

12. A power plant system comprising an underwater power plant for converting kinetic energy of flowing water into electricity, the power plant comprising at least one turbine house defining a duct for housing a turbine apparatus, and a connecting means for attaching the turbine apparatus in the duct, the connecting means comprising at least one member slidably connected to the at least one turbine house for allowing sliding of the turbine apparatus out of, into or within the at least one turbine house, wherein the at least one member is an elongate member having a length exceeding an axial length of the turbine apparatus, and wherein the elongate member is capable of attaching the turbine apparatus to the at least one turbine house also when the turbine apparatus is slid axially to a position outside of the at least one turbine house, to allow vertical lifting of the turbine apparatus;

wherein the system further comprises a base for supporting the at least one turbine house, the base comprising at least one modular base frame connectable to a plurality of supports extending into a seabed.

13. The power plant system according to claim 12, wherein the base is provided with a receptacle for holding at least a coupling unit for connecting a jumper cable from the turbine apparatus to at least an electric power cable.

14. The power plant system according to claim 13, wherein the receptacle is further provided with an openable hatch for protecting the coupling unit when in operation.

15. A method for bringing a turbine apparatus into, out of or within an underwater power plant for converting kinetic energy of flowing water into electricity, the power plant comprising at least one turbine house defining a duct for housing the turbine apparatus, and a connecting means for attaching the turbine apparatus in the duct, the connecting means comprising at least one member slidably connected to the at least one turbine house for allowing sliding of the turbine apparatus out of, into or within the at least one turbine house, wherein the at least one member is an elongate member having a length exceeding an axial length of the turbine apparatus, and wherein the elongate member is capable of attaching the turbine apparatus to the at least one turbine house also when the turbine apparatus is slid axially to a position outside of the at least one turbine house, to allow vertical lifting of the turbine apparatus;

wherein the method comprises:

sliding the turbine apparatus with respect to the at least one turbine house into, out of or within the duct of the at least one turbine house.

\* \* \* \* \*